(12) United States Patent
Moon et al.

(10) Patent No.: US 11,616,265 B2
(45) Date of Patent: Mar. 28, 2023

(54) BATTERY MODULE

(71) Applicant: Samsung SDI Co., Ltd., Yongin-si (KR)

(72) Inventors: Soodeok Moon, Yongin-si (KR); Sungyong Kim, Yongin-si (KR); Jaeho Kim, Yongin-si (KR); Daeyeop Park, Yongin-si (KR); Jangwoong Bae, Yongin-si (KR); Junhyung Lee, Yongin-si (KR); Dooyong Lim, Yongin-si (KR); Jisoon Lim, Yongin-si (KR); Eungi Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/656,099

(22) Filed: Oct. 17, 2019

(65) Prior Publication Data

US 2020/0127255 A1 Apr. 23, 2020

(30) Foreign Application Priority Data

Oct. 19, 2018 (KR) .......................... 10-2018-0125548

(51) Int. Cl.
*H01M 2/10* (2006.01)
*H01M 10/613* (2014.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC .. H01M 50/20; H01M 10/613; H01M 10/625; H01M 10/6556; H01M 10/6568;
(Continued)

(56) References Cited

U.S. PATENT DOCUMENTS 6,146,778 A 11/2000 Rouillard et al.
6,255,015 B1 7/2001 Corrigan et al.
(Continued)

FOREIGN PATENT DOCUMENTS

CN 1324499 A 11/2001
CN 102117930 A 7/2011
(Continued)

OTHER PUBLICATIONS

EPO Extended Search Report dated Mar. 4, 2020, corresponding to European Patent Application No. 19203926.1 (7 pages).
(Continued)

*Primary Examiner* — Muhammad S Siddiquee

(74) *Attorney, Agent, or Firm* — Lewis Roca Rothgerber Christie LLP

(57) ABSTRACT

A battery module includes first and second modules each including a series of cell stacks, each including a series of unit cells arranged in a first direction, and an insulation member insulating at least one unit cell. The battery module also includes a module housing, a coupling part on the module housing configured to couple the module housings of the first and second modules together, and a series of receiving parts in the module housing accommodating the cell stacks. Each receiving part includes a fixed wall around a respective cell stack and having at least a portion that is in contact with the respective cell stack. The coupling part includes a connector configured to electrically connect the module housings of the first and second modules together.

17 Claims, 16 Drawing Sheets

(51) Int. Cl.
*H01M 10/625* (2014.01)
*H01M 10/6556* (2014.01)
*H01M 10/6568* (2014.01)
*H01M 50/20* (2021.01)

(52) U.S. Cl.
CPC ... *H01M 10/6556* (2015.04); *H01M 10/6568* (2015.04); *H01M 2220/20* (2013.01)

(58) Field of Classification Search
CPC ......... H01M 2220/20; H01M 10/6567; H01M 50/502; H01M 10/425; H01M 2010/4271; Y02E 60/10
See application file for complete search history.

(56) References Cited

U.S. PATENT DOCUMENTS

| | | | |
|---|---|---|---|
| 6,555,264 | B1 | 4/2003 | Hamada et al. |
| 6,864,013 | B2 | 3/2005 | Gow et al. |
| 2005/0255379 | A1 | 11/2005 | Marchio et al. |
| 2007/0054561 | A1 | 3/2007 | Gutman et al. |
| 2007/0087266 | A1 | 4/2007 | Bourke et al. |
| 2010/0009251 | A1 | 1/2010 | Shin et al. |
| 2010/0266887 | A1 | 10/2010 | Sekino et al. |
| 2010/0285347 | A1 | 11/2010 | Saito et al. |
| 2011/0165451 | A1 | 7/2011 | Kim et al. |
| 2011/0300433 | A1 | 12/2011 | Kim |
| 2012/0103714 | A1 | 5/2012 | Choi et al. |
| 2012/0115013 | A1 | 5/2012 | Kim et al. |
| 2012/0177970 | A1 | 7/2012 | Marchio et al. |
| 2013/0045403 | A1 | 2/2013 | Shin et al. |
| 2013/0089763 | A1 | 4/2013 | Lee |
| 2013/0207459 | A1 | 8/2013 | Schröder et al. |
| 2013/0260195 | A1 | 10/2013 | Long |
| 2014/0141311 | A1 | 5/2014 | Michelitsch |
| 2014/0234690 | A1 | 8/2014 | Le et al. |
| 2015/0042158 | A1 | 2/2015 | Schmidt et al. |
| 2015/0229010 | A1 | 8/2015 | Ahn |
| 2015/0357617 | A1 | 12/2015 | Okada |
| 2016/0028056 | A1 | 1/2016 | Lee et al. |
| 2016/0056427 | A1 | 2/2016 | Kim et al. |
| 2016/0118635 | A1 | 4/2016 | Keller et al. |
| 2016/0164054 | A1 | 6/2016 | Yamamoto et al. |
| 2016/0233464 | A1 | 8/2016 | Nusier et al. |
| 2016/0233468 | A1 | 8/2016 | Nusier et al. |
| 2016/0268657 | A1 | 9/2016 | Park et al. |
| 2017/0062783 | A1 | 3/2017 | Kim et al. |
| 2017/0062789 | A1 | 3/2017 | Sim et al. |
| 2017/0133706 | A1 | 5/2017 | Ejima |
| 2017/0263910 | A1 | 9/2017 | Kobayashi et al. |
| 2017/0365888 | A1 | 12/2017 | Kwon et al. |
| 2018/0013111 | A1 | 1/2018 | Wuensche et al. |
| 2018/0026243 | A1* | 1/2018 | Stojanovic ............ H01M 50/20 429/99 |
| 2018/0102576 | A1 | 4/2018 | Yamamoto et al. |
| 2018/0109016 | A1 | 4/2018 | Fees et al. |
| 2018/0123200 | A1 | 5/2018 | Golubkov |
| 2018/0138466 | A1 | 5/2018 | Fees et al. |
| 2018/0138473 | A1 | 5/2018 | Bessho et al. |
| 2018/0138560 | A1 | 5/2018 | Bessho |
| 2018/0175466 | A1 | 6/2018 | Seo et al. |
| 2018/0269443 | A1 | 9/2018 | Takahashi et al. |
| 2018/0294452 | A1 | 10/2018 | Tan et al. |
| 2018/0331402 | A1 | 11/2018 | Inoue |
| 2018/0337374 | A1 | 11/2018 | Matecki et al. |
| 2019/0088911 | A1 | 3/2019 | Peng et al. |
| 2019/0123318 | A1 | 4/2019 | Fees et al. |
| 2019/0198845 | A1 | 6/2019 | Bae et al. |
| 2019/0296294 | A1 | 9/2019 | Hirschbeck et al. |
| 2019/0305273 | A1 | 10/2019 | Long et al. |
| 2019/0348725 | A1 | 11/2019 | Golubkov |
| 2020/0006824 | A1* | 1/2020 | Lim .................... H01M 10/625 |
| 2020/0067155 | A1 | 2/2020 | Hwang et al. |
| 2020/0127258 | A1 | 4/2020 | Lim et al. |
| 2020/0313128 | A1* | 10/2020 | Schnakenberg ...... H01M 50/10 |
| 2021/0143505 | A1 | 5/2021 | Hidaka |

FOREIGN PATENT DOCUMENTS

| | | |
|---|---|---|
| CN | 102270754 A | 12/2011 |
| CN | 102934254 A | 2/2013 |
| CN | 103035975 A | 4/2013 |
| CN | 103380511 A | 10/2013 |
| CN | 103890997 A | 6/2014 |
| CN | 104137294 A | 11/2014 |
| CN | 104617244 A | 5/2015 |
| CN | 104835980 A | 8/2015 |
| CN | 104904033 A | 9/2015 |
| CN | 104995760 A | 10/2015 |
| CN | 105552261 A | 5/2016 |
| CN | 105870370 A | 8/2016 |
| CN | 205768594 U | 12/2016 |
| CN | 106299176 A | 1/2017 |
| CN | 106486622 A | 3/2017 |
| CN | 206210887 U | 5/2017 |
| CN | 206584990 U | 10/2017 |
| CN | 107528019 A | 12/2017 |
| CN | 107591500 A | 1/2018 |
| CN | 107644960 A | 1/2018 |
| CN | 107658401 A | 2/2018 |
| CN | 207199697 U | 4/2018 |
| CN | 207398218 U | 5/2018 |
| CN | 207690855 U | 8/2018 |
| CN | 207818706 U | 9/2018 |
| CN | 108630851 A | 10/2018 |
| CN | 210628373 U | 5/2020 |
| EP | 2450990 A2 | 5/2012 |
| EP | 2 608 309 A1 | 6/2013 |
| EP | 3 273 500 A1 | 1/2018 |
| EP | 3 316 340 A1 | 5/2018 |
| EP | 3 327 817 A1 | 5/2018 |
| JP | 2003-249202 A | 9/2003 |
| JP | 3906706 B2 | 4/2007 |
| JP | 2013-8521 A | 1/2013 |
| JP | 2017-37754 A | 2/2017 |
| JP | 6117308 B2 | 4/2017 |
| JP | 6224321 B2 | 11/2017 |
| JP | 2018-073551 A | 5/2018 |
| KR | 10-2010-0055477 A | 5/2010 |
| KR | 10-2013-0113740 A | 10/2013 |
| KR | 10-1584295 B1 | 1/2016 |
| KR | 10-2016-0037542 A | 4/2016 |
| KR | 10-2017-0011212 A | 2/2017 |
| KR | 10-2017-0025074 A | 3/2017 |
| KR | 10-2017-0053429 A | 5/2017 |
| KR | 10-2018-0045840 A | 5/2018 |
| KR | 10-2018-0054382 A | 5/2018 |
| KR | 10-2019-0079367 A | 7/2019 |
| WO | WO 00/11730 A1 | 3/2000 |
| WO | WO 2007/027603 A2 | 3/2007 |
| WO | WO 2016/166972 A1 | 10/2016 |
| WO | WO 2017/132575 A1 | 8/2017 |
| WO | WO 2017/220515 A1 | 12/2017 |
| WO | WO 2018/062869 A1 | 4/2018 |
| WO | WO 2018/105981 A1 | 6/2018 |
| WO | WO 2018/142809 A1 | 8/2018 |

OTHER PUBLICATIONS

S. Office Action dated Mar. 17, 2021, issued in U.S. Appl. No. 16/656,324 (17 pages).
Extended European Search Report for corresponding European Patent Application No. 19203933.7, dated Feb. 20, 2020, 10 pages.
Extended European Search Report for corresponding European Patent Application No. 19203930.3, dated Feb. 24, 2020, 6 pages.
Extended European Search Report for corresponding European Patent Application No. 19203917.0, dated Feb. 24, 2020, 7 pages.
Extended European Search Report for corresponding European Patent Application No. 19203935.2, dated Feb. 24, 2020, 9 pages.
Extended European Search Report for corresponding European Patent Application No. 19203939.4, dated Feb. 28, 2020, 10 pages.
U.S. Office Action dated Jun. 28, 2021, issued in U.S. Appl. No. 16/655,889 (9 pages).
U.S. Final Office Action dated Jun. 29, 2021, issued in U.S. Appl. No. 16/656,324 (15 pages).

(56) References Cited

OTHER PUBLICATIONS

U.S. Office Action dated Sep. 1, 2021, issued in U.S. Appl. No. 16/656,406 (10 pages).
U.S. Advisory Action dated Sep. 2, 2021, issued in U.S. Appl. No. 16/656,324 (3 pages).
U.S. Office Action dated Oct. 26, 2021, issued in U.S. Appl. No. 16/656,197 (11 pages).
U.S. Final Office Action dated Dec. 17, 2021, issued in U.S. Appl. No. 16/655,889 (8 pages).
Chinese Office Action, with English translation, dated Dec. 2, 2021, issued in Chinese Patent Application No. 201910988939.6 (22 pages).
Chinese Office Action, with English translation, dated Dec. 3, 2021, issued in Chinese Patent Application No. 201910989674.1 (23 pages).
Chinese Office Action, with English translation, dated Dec. 21, 2021, issued in corresponding Chinese Patent Application No. 201910989914.8 (18 pages).
Chinese Office Action, with English translation, dated Dec. 23, 2021, issued in Chinese Patent Application No. 201910990468.2 (15 pages).
Chinese Office Action, with English translation, dated Dec. 24, 2021, issued in Chinese Patent Application No. 201910988354.4 (21 pages).
Chinese Office Action, with English translation, dated Dec. 28, 2021, issued in Chinese Patent Application No. 201910989841.2 (16 pages).
U.S. Office Action dated Nov. 29, 2021, issued in U.S. Appl. No. 16/656,190 (15 pages).
U.S. Notice of Allowance dated Jan. 10, 2022, issued in U.S. Appl. No. 16/656,324 (8 pages).
Chinese Office Action dated Jun. 15, 2022, issued in Chinese Patent Application No. 201910988939.6 (9 pages).
Chinese Notice of Allowance dated Jun. 15, 2022, issued in Chinese Patent Application No. 201910989841.2 (7 pages).
U.S. Notice of Allowance dated Jun. 28, 2022, issued in U.S. Appl. No. 16/656,324 (7 pages).
U.S. Advisory Action from U.S. Appl. No. 16/655,889, dated Feb. 10, 2022, 3 pages.
U.S. Notice of Allowance from U.S. Appl. No. 16/655,889, dated Apr. 18, 2022, 8 pages.
U.S. Office Action from U.S. Appl. No. 16/656,190, dated May 19, 2022, 17 pages.
U.S. Office Action from U.S. Appl. No. 16/656,197, dated Apr. 27, 2022, 20 pages.
U.S. Notice of Allowance from U.S. Appl. No. 16/656,324, dated May 4, 2022, 11 pages.
U.S. Office Action from U.S. Appl. No. 16/656,406, dated Feb. 25, 2022, 9 pages.
U.S. Office Action from U.S. Appl. No. 16/656,406, dated May 4, 2022, 9 pages.
U.S. Notice of Allowance dated Jul. 20, 2022, issued in U.S. Appl. No. 16/656,324 (11 pages).
U.S. Notice of Allowance dated Aug. 11, 2022, issued in U.S. Appl. No. 16/655,889 (8 pages).
U.S. Notice of Allowance dated Aug. 17, 2022, issued in U.S. Appl. No. 16/656,406 (5 pages).
U.S. Office Action dated Sep. 23, 2022, issued in U.S. Appl. No. 16/656,190 (22 pages).
Chinese Office Acton, with English translation, dated Aug. 3, 2022, issued in Chinese Patent Application No. 201910990468.2 (27 pages).
EPO Office Action dated Aug. 5, 2022, issued in European Patent Application No. 19203939.4 (4 pages).
EPO Office Action dated Sep. 1, 2022, issued in European Patent Application No. 19203935.2 (4 pages).
U.S. Office Action dated Sep. 29, 2022, issued in U.S. Appl. No. 16/656,197 (14 pages).
Chinese Notice of Allowance, with English translation, dated Jul. 25, 2022, issued in Chinese Patent Application No. 201910988354.4 (6 pages).
Chinese Office Action, with English translation, dated Jul. 22, 2022, issued in Chinese Patent Application No. 201910989674.1 (19 pages).
EPO Office Action dated Jul. 26, 2022, issued in European Patent Application No. 19203930.3 (5 pages).
Chinese Notice of Allowance, with English translation, dated Nov. 4, 2022, issued in Chinese Patent Application No. 201910990468.2 (6 pages).
U.S. Notice of Allowance dated Dec. 7, 2022, issued in U.S. Appl. No. 16/656,406 (5 pages).
U.S. Notice of Allowance dated Dec. 7, 2022, issued in U.S. Appl. No. 16/656,324 (8 pages).
U.S. Office Action dated Feb. 7, 2023, issued in U.S. Appl. No. 16/655,889 (8 pages).

* cited by examiner

BATTERY MODULE

CROSS-REFERENCE TO RELATED APPLICATIONS

This application claims priority to and the benefit of Korean Patent Application No. 10-2018-0125548 filed in the Korean Intellectual Property Office on Oct. 19, 2018, the entire contents of which are incorporated herein by reference, and incorporates, in their entirety, by reference U.S. patent application Ser. No. 16/656,197, U.S. patent application Ser. No. 16/656,324, U.S. patent application Ser. No. 16/655,889, U.S. patent application Ser. No. 16/656,406, U.S. patent application Ser. No. 16/656,190, filed on even date herewith.

BACKGROUND

1. Field

The present invention relates to a battery module, and to a battery module including a series of cell stacks formed of a series of unit cells.

2. Description of the Related Art

A rechargeable or secondary battery is different from a primary battery in that charge and discharge are repeatable, and the primary battery provides only irreversible conversion from a chemical material to electric energy. A low-capacity rechargeable battery may be used as a power source of a small electronic device, such as a mobile phone, a notebook computer, a computer, and a camcorder, and a large-capacity rechargeable battery may be used as a power source of a hybrid vehicle and the like.

The secondary battery may include a positive electrode, a negative electrode, an electrode assembly including a separator interposed between the positive electrode and the negative electrode, a case accommodating the electrode assembly, and an electrode terminal electrically connected with the electrode assembly.

An electrolyte solution is injected into the case so as to enable a battery to be chargeable and rechargeable by an electrochemical reaction of the positive electrode, the negative electrode, and the electrolyte solution. A shape of the case, which may have a cylindrical shape or a rectangular shape, may be different according to usage of a battery.

A rechargeable battery in the form of a cell stack formed of a plurality of unit cells which are combined in series or in parallel may provide, for example, high energy density for travelling of a hybrid vehicle.

The power amount required by an electric vehicle (EV), a hybrid electric vehicle (HEV), and other electric energy consuming devices, is increased according to the development of technology, and in order to satisfy the power amount, a plurality of battery modules may be provided.

Accordingly, it is an important subject to develop a new module structure, in which a plurality of cell stacks, which may meet demanded power of an electric energy consuming device, is provided, component parts are simplified, manufacturing cost and weight are effectively decreased, and a manufacturing process efficiently progresses.

SUMMARY

The present disclosure has been made in an effort to provide a battery module, which is capable of effectively improving the power amount, simplifying component parts, and efficiently improving a manufacturing process. According to the exemplary embodiments of the present disclosure, it is possible to effectively improve electric energy, simplify components, and efficiently improve a manufacturing process.

An exemplary embodiment of the present invention provides a battery module including a first module and a second module each including a series of cell stacks each having a series of unit cells arranged in a first direction and an insulation member insulating at least one unit cell. The battery module also includes and a module housing, a coupling unit on the module housing configured to couple the module housing of the first module to the module housing of the second module, and a series of receiving parts in the module housing accommodating the series of cell stacks. Each receiving part includes a fixed wall around a respective cell stack and having at least a portion that is in contact with the respective cell stack. The coupling part includes a connector configured to electrically connect the module housing of the first module to the module housing of the second module.

The connector may include: a male connector provided on a first wall positioned in a second direction perpendicular to the first direction in an outer wall surrounding an internal space of the module housing; and a female connector, which is provided on a second wall positioned at a side opposite to the first wall in the outer wall and is coupled to a male connector of the adjacent module housing.

The male connector may include a first electrical connection part, which protrudes in the second direction and is electrically connected with the cell stack inside the module housing, and the female connector may include a second electrical connection part, which is indented in the second direction and into which the first electrical connection part of the male connector of the adjacent module housing is inserted.

The male connector may further include a first signal connection part, which protrudes in the second direction and transfers a management control signal of the cell stack, and the female connector may further include a second signal connection part, which is indented in the second direction and into which the first signal connection part of the male connector of the adjacent module housing is inserted.

The connector may be formed with a communicating hole, through which an internal side and an external side of the module housing communicate, at a center of the connector.

The coupling part may further include: a guide protrusion, which is positioned in a lateral portion of the male connector on the first wall and protrudes in the second direction; and a guide recess, which is positioned in a lateral portion of the female connector on the second wall and into which a guide protrusion of the adjacent module housing is inserted.

The guide protrusion may be formed with a fastening recess in a height direction of the outer wall, a fastening hole may be formed on a lateral surface of the guide recess at a position corresponding to the fastening recess, and the guide protrusion may pass through the fastening hole and be coupled to the guide recess through a fastening member that is inserted into the fastening recess.

The male connector may further include a seal supporting wall, which surrounds the first electrical connection part and the first signal connection part, protrudes in the second direction, and a sealing member at an end portion of the seal supporting wall.

The receiving parts may be disposed to form a first column and a second column in the second direction, and the cell stacks included in the first column may be electrically separated from the cell stacks included in the second column.

The battery module may further include: stack bus bars, which electrically connect the plurality of unit cells in the cell stack; a connection bus bar, which electrically connects two cell stacks adjacent in the second direction in the first column or the second column; and a terminal bus bar, which is drawn from the cell stack and is connected with the electrical connection part or the electrical connection part.

The electrical connection part may include a first protrusion electrically connected with the cell stacks included in the first column, and a second protrusion electrically connected with the cell stacks included in the second column, and the electrical connection part may include a first accommodating part, which is electrically connected with the cell stacks included in the first column and is coupled with the first protrusion of the adjacent module housing, and a second accommodating part, which is electrically connected with the cell stacks included in the second column and is coupled with the second protrusion of the adjacent module housing.

The terminal bus bar may be connected to a unit cell at one end portion in the cell stack and the connection bus bar may be connected to a unit cell at the other end portion, and the cell stack may be disposed so that the one end portion faces a space between the first column and the second column, and the terminal bus bar may be drawn to the space between the first column and the second column.

The terminal bus bars drawn from the cell stacks of the first column and the terminal bus bars drawn from the cell stacks of the second column may be alternately disposed in the second direction.

The fixed wall may include: a separation wall, which cross an internal space surrounded by an outer wall of the module housing in the first direction and is in contact with a side surface of the cell stack; and end walls, which are disposed at both sides in the first direction and press end surfaces at both sides of the cell stack in the first direction, respectively.

The end wall, which is disposed so that one surface faces the outer wall of the module housing, may be spaced apart from the outer wall in the first direction, so that a first impact absorption space may be formed between the end wall and the outer wall.

In two receiving parts adjacent in the first direction, the end walls disposed on one surfaces facing in the first direction may be spaced apart from each other, so that a second impact absorption space may be formed between the end walls, and the terminal bus bar drawn from the cell stack may be drawn to the second impact absorption space.

The cell stack may further include one pair of end supports, which are disposed at both end portions in the first direction, respectively, and of which exterior surfaces correspond to the end surfaces, and the end wall may be bent outwardly so that a center portion is far from the facing end surface, and the end surface may be indented inwardly so that a center portion is far from the facing end wall to form a swelling space.

The end wall may include a plurality of first ribs, which is extended in a height direction of the end wall on an exterior surface of the end wall and is spaced apart from each other in the second direction, and the end support may include a plurality of second ribs, which is spaced apart from each other in the second direction and a height direction of the end support so as to form a lattice shape in the end surface.

The module housing may be formed with a cooling channel, in which coolant flows, under a floor surface.

DETAILED DESCRIPTION

Figure 1:
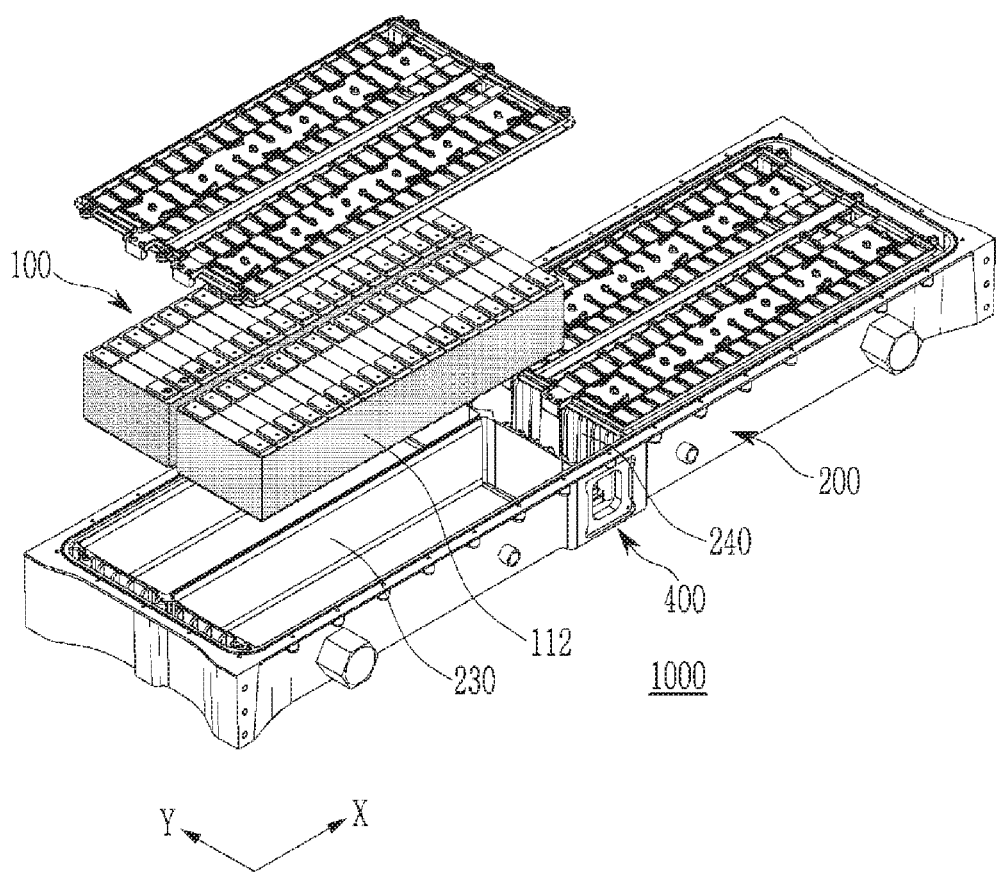
FIG. 1 is a diagram illustrating a battery module according to an exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, overlapping description of the same constituent element will be omitted.

Further, in the present specification, it should be understood that when one constituent element referred to as being "coupled to" or "connected to" another constituent element, one constituent element can be directly coupled to or connected to the other constituent element, but intervening elements may also be present. In contrast, when one constituent element is "directly coupled to" or "directly connected to" another constituent element, it should be understood that there are no intervening element present.

Further, terms used in the present specification are used for simply explaining a specific exemplary embodiment, and are not used for intending to limit the present invention.

Singular expressions used herein include plurals expressions unless they have definitely opposite meanings in the context.

Further, in the present specification, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Further, in the present specification, a term "and/or" includes a combination of a plurality of described items or any item among the plurality of described items. In the present specification, "A or B" may include "A", "B", or "both A and B".

Figure 2:
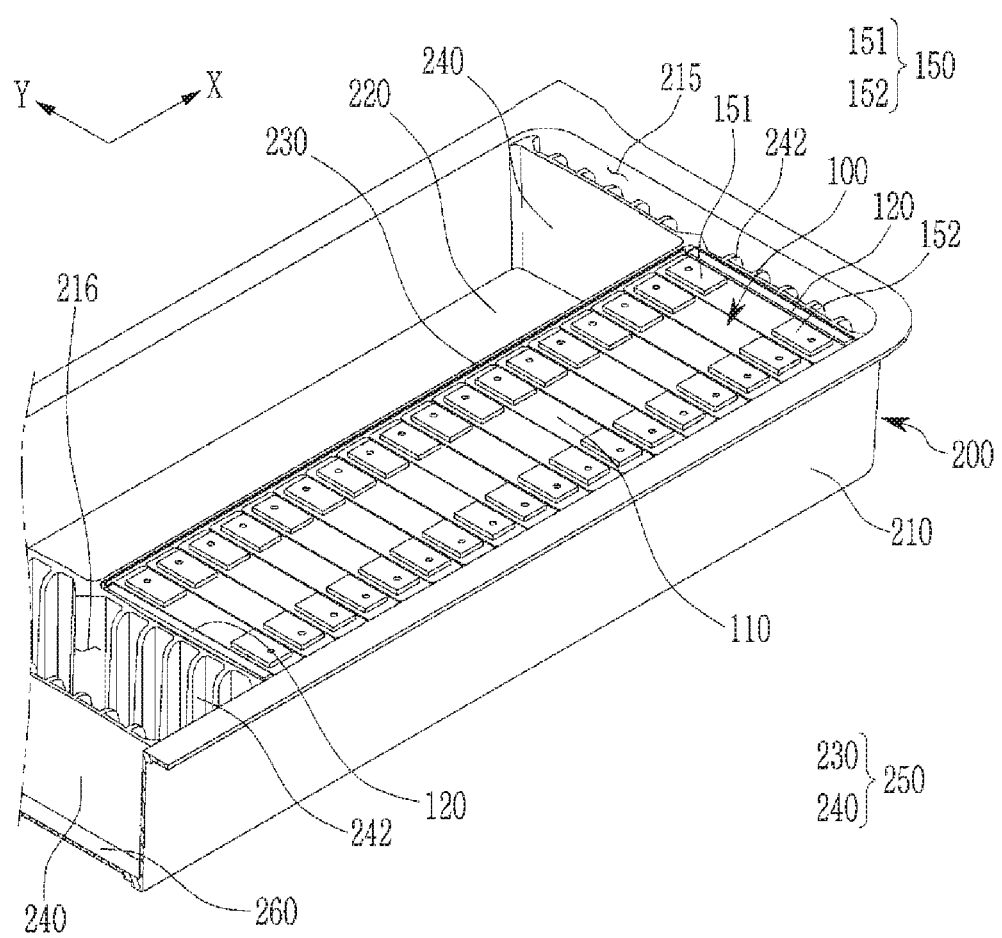
FIG. 2 is a diagram illustrating a receiving part in the battery module according to the exemplary embodiment of the present invention.

FIG. 1 illustrates a battery module 1000 according to an exemplary embodiment of the present disclosure, and FIG. 2 illustrates a receiving part 220 illustrated in FIG. 1.

As illustrated in FIGS. 1 and 2, the battery module 1000 according to the exemplary embodiment of the present disclosure includes a cell stack 100 including a plurality of unit cells 110 arranged in a first direction X and an insulation member 112 surrounding the plurality of unit cells 110. The battery module also includes a module housing 200 and a plurality of receiving parts 220 in the module housing 200 into which the cell stacks 100 are inserted. The receiving part 220 includes a fixed wall 250, which surrounds the cell stack 100 and at least a part of which is in contact with the cell stack 100, and the receiving part 220 further includes a coupling part 400, which is provided in the module housing 200 and is coupled with an adjacent module housing 1001. The coupling part 400 includes a connector 500, which connects the module housing 200 and the adjacent module housing 1001 electrically and by a signal.

The cell stack 100 includes the plurality of unit cells 110 arranged in the first direction X. The unit cell 110 corresponds to one secondary battery including an electrode assembly and provided with a terminal unit 150, and may have a case having various shapes, such as a square shape or a cylindrical shape.

In FIGS. 1 and 2, the unit cell 110 having the case shaped like a rectangular pillar is illustrated, but the present disclosure is not limited thereto, and hereinafter, for convenience of the description, the present invention will be described based on the unit cell 110 having the case shaped like a rectangular pillar illustrated in FIGS. 1 and 2.

Each of the unit cells 110 includes the terminal unit 150, which is electrically connected with an electrode assembly, and the terminal unit 150 may be provided in pair and be electrically connected to a first electrode and a second electrode of the electrode assembly. That is, the terminal unit 150 may include a first terminal 151 connected to the first electrode and a second terminal 152 connected to the second electrode.

The configuration and location of the terminal unit 150 may be various, but in an exemplary embodiment of the present disclosure, the terminal unit 150 may be provided on a cap plate coupled to an opening of the case as illustrated in FIG. 1, and the pair of terminal units 150 having different polarities may be disposed at both end portions of the cap plate.

In the cell stack 100, the plurality of unit cells 110 may be arranged, and an arrangement direction of the unit cells 110 may be various, but the plurality of unit cells 110 may be arranged in a direction in which wider lateral surfaces among the lateral surfaces of the unit cells 110 face each other as illustrated in FIGS. 1 and 2. Hereinafter, the arrangement direction of the unit cells 110 is defined as the first direction X. The unit cells 110 may be disposed or the end supports 120 may be disposed at both ends of the cell stack 100 in the first direction X.

The number of unit cells 110 in the cell stack 100 may be various as desired. The unit cells 110 included in one cell stack 100 may be electrically connected with each other by using a stack bus bar 172 (see FIG. 10), which is to be described below, and the like.

Additionally, in the illustrated embodiment, the cell stack 100 includes an insulation member 112 surrounding the plurality of unit cells 110. The insulation member 112 is formed of an insulating material, such as rubber and plastic, and surrounds the plurality of unit cells 110.

As desired, the insulation member 112 may also be provided so as to surround the end supports 120 disposed at both ends of the cell stack 100 in the first direction X together with the plurality of unit cells 110, and may surround only the plurality of unit cells 110, except for the end supports 120, and the end supports 120 may also be separately disposed at both ends of the cell stack 100.

The insulation member 112 may be provided in the form of a film, or a plurality of configurations shaped like a plate having hardness may be provided in the insulation member 112. The insulation member 112 may be provided in the form surrounding all of the four lateral surfaces of the cell stack 100 or may be disposed at some of the four lateral surfaces, and may also be provided so as to surround both an upper surface and a lower surface of the cell stack 100. However, the insulation member 112 disposed on the upper surface of the cell stack 100 may be provided so as to expose the terminal unit of each unit cell 110.

FIG. 1 illustrates an embodiment where the insulation member 112 is prepared in the form of an insulation film to surround the lateral surfaces of the plurality of unit cells 110, except for the end supports 120, in the cell stack 100.

In the module housing 200, a plurality of receiving parts 220, into which the cell stacks 100 are inserted, is provided. FIG. 1 illustrates the state where four receiving parts 220 are formed in the module housing 200, and in FIG. 2, two receiving parts 220 are separately illustrated in the module housing 200 illustrated in FIG. 1. The number of receiving parts 220 provided in the module housing 200 may be changed as desired depending, for instance, on the desired capacity of the battery module 1000.

In the module housing 200, an outer wall 210, which protrudes from a floor surface 260 in an upper direction and surrounds the floor surface 260, is present, and an internal space is formed at an inner side of the outer wall 210. The plurality of receiving parts 220 may be provided in the internal space.

A shape of the module housing 200 may be various, and the module housing 200 according to an exemplary embodiment of the present disclosure may be provided so as to have the floor surface 260 having an approximately quadrangular shape as illustrated in FIGS. 1 and 2.

The module housing 200 may be provided in the form in which an upper portion of the module housing 200 is opened, and thus, the receiving parts 220 provided in the module housing 200 may also be provided in the form in which an upper portion of the receiving parts 220 is opened. A module cover may be coupled to the opened upper surface of the module housing 200 so that the module housing 200 may be sealed, and when the module cover is coupled with the module housing 200, the module cover corresponds to the upper surface of the receiving parts 220. The module cover may include a bus bar holder for covering the cell stack 100, and bus bars arranged in the bus bar holder to electrically connect the unit cells 110 constituting the cell stack 100.

Additionally, FIGS. 1 and 2 illustrate the receiving part 220 according to an exemplary embodiment of the present disclosure. Each of the receiving parts 220 includes the fixed wall 250 which surrounds a corresponding cell stack 100 and of which at least a part is in contact with the cell stack 100.

FIG. 1 illustrates the state where a first receiving part 220, into which the cell stack 100 is inserted, and a second receiving part 220, into which the cell stack 100 is not inserted, are disposed in parallel. The fixed wall 250 corresponds to a boundary wall around (or surrounding) an area of the receiving part 220, and the cell stack 100 inserted into the receiving part 220 maintains a fixed state by being surrounded by the fixed wall 250 in four directions.

The fixed wall 250 may be variously configured according to the form of the cell stack 100, but as illustrated in FIG. 1, the fixed wall 250 may have four surfaces, which support four-directional lateral surfaces of the cell stack 100 while facing the four-directional lateral surfaces, respectively, and be disposed so as to surround the cell stack 100.

At least a part of the fixed wall 250 of the receiving part 220 is in direct contact with the cell stack 100. For example, any one surface of the fixed wall 250 positioned in the first direction X may also be in direct contact with the cell stack 100, and any one surface of the fixed wall 250 positioned in a second direction Y perpendicular to the first direction X may also be in direct contact with the lateral surfaces of the plurality of unit cells 110, for example, the insulation member 112.

The second direction Y may be defined as a direction perpendicular to the first direction X on the same plane as that of the first direction X, and may be defined as a width direction of the unit cell 110 as illustrated in FIG. 1.

In an exemplary embodiment of the present disclosure, the cell stack 100 may maintain its shape by the fixed wall 250 even without a separate component, and may maintain a state pressed in the first direction X.

In a case of a related art general battery module, not the battery module 1000 of the present disclosure, a module frame is coupled to one cell stack and one cell stack, which is coupled with the module frame and is treated as a unit configuration, forms one module.

The generally treated cell stack may be coupled with a module frame for a performance aspect, such as energy density, and treatment easiness, and the module frame may be formed of end blocks pressing both ends of the cell stack, side plates extended alongside surfaces of the cell stack, and the like, and the end blocks and the side plates may be coupled with each other in the state where the cell stack is pressed to maintain the structure of the cell stack.

In a related art general battery module, the cell stack coupled with the module frame is inserted and the module housing is fastened to the module frame, and the general battery module becomes a battery module having the power amount provided by one cell stack.

In the case of the related art general battery module, a plurality of battery modules needs to be provided so as to meet higher power demanded than that of one cell stack, and thus, a module frame fastening the cell units into a unit body and a plurality of components configuring a module itself are additionally required.

In the battery module 1000 according to an exemplary embodiment of the present disclosure, the plurality of cell stacks 100 is mounted to one module, unlike the related art general battery module, which is thus advantageous to meet the high power demanded, and the cell stack 100 is fixed by the fixed wall 250 of the receiving part 220, of which at least a part is separate from the outer wall 210 of the module housing 200, so that a component, such as a module frame, for fixing the cell stack 100, is not separately required.

Figure 3:
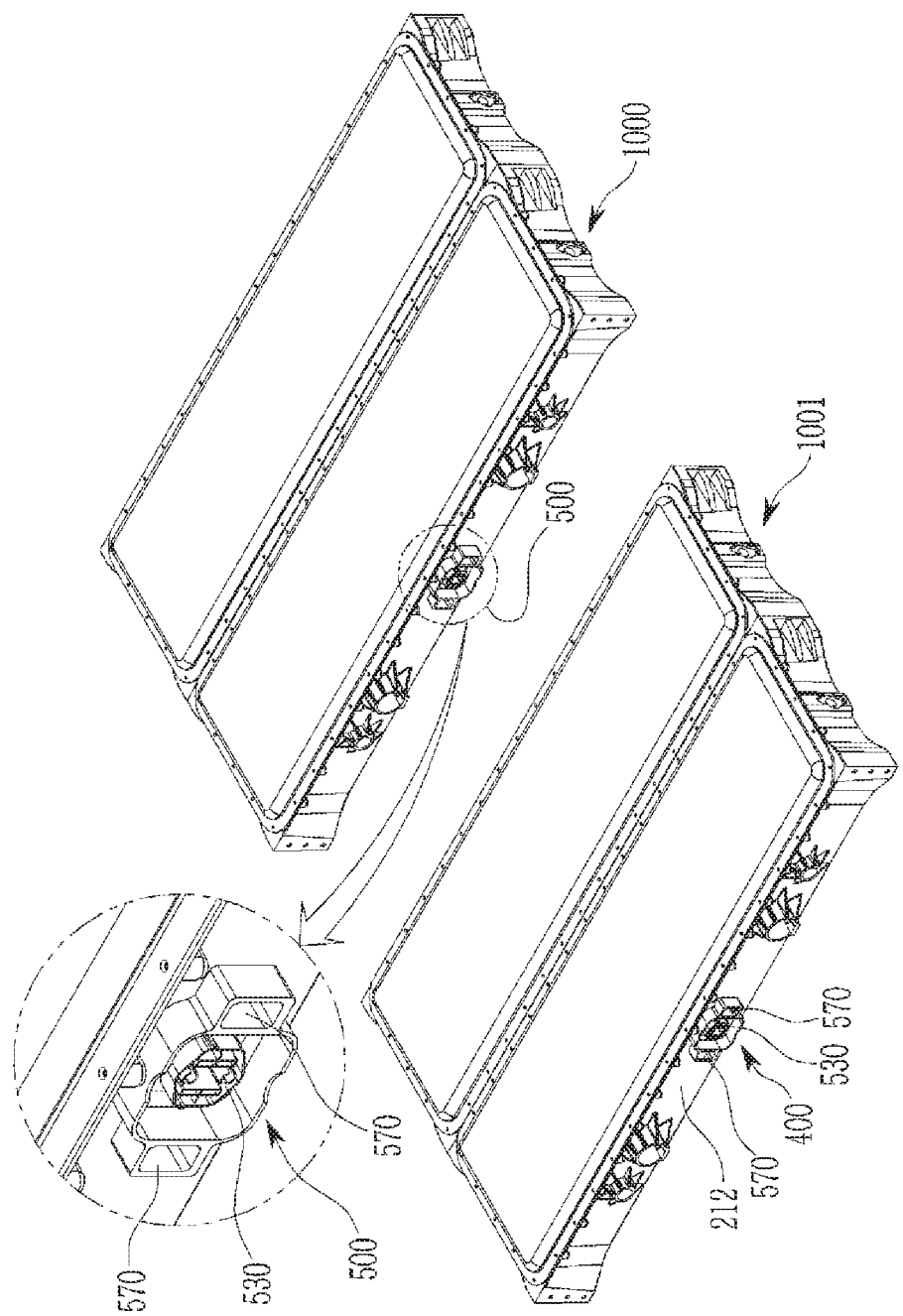
FIG. 3 is a diagram illustrating a state where the modules of the battery are combined with each other according to the exemplary embodiment of the present invention.

FIG. 3 illustrates the state where the plurality of battery modules 1000 according to an exemplary embodiment of the present disclosure is provided and coupled with each other. That is, FIG. 3 illustrates the state where the battery modules 1000 are coupled with each other to form a large pack.

As illustrated in FIG. 3, the battery modules 1000 according to the exemplary embodiment of the present invention may further include a coupling part 400, which is provided at the module housing 200 and is coupled with the adjacent module housing 200 (e.g., the coupling part 400 couples the module housing 200 of a first module 1000 to the module housing 200 of a second module 1001).

The battery modules 1000 may be coupled with each other in order to meet power demanded to implement a large pack structure, and FIG. 3 illustrates the state where the coupling part 400 is formed on one surface of the module housing 200 and the coupling parts 400 of the adjacent battery modules 1000 are coupled to each other.

Figure 4:
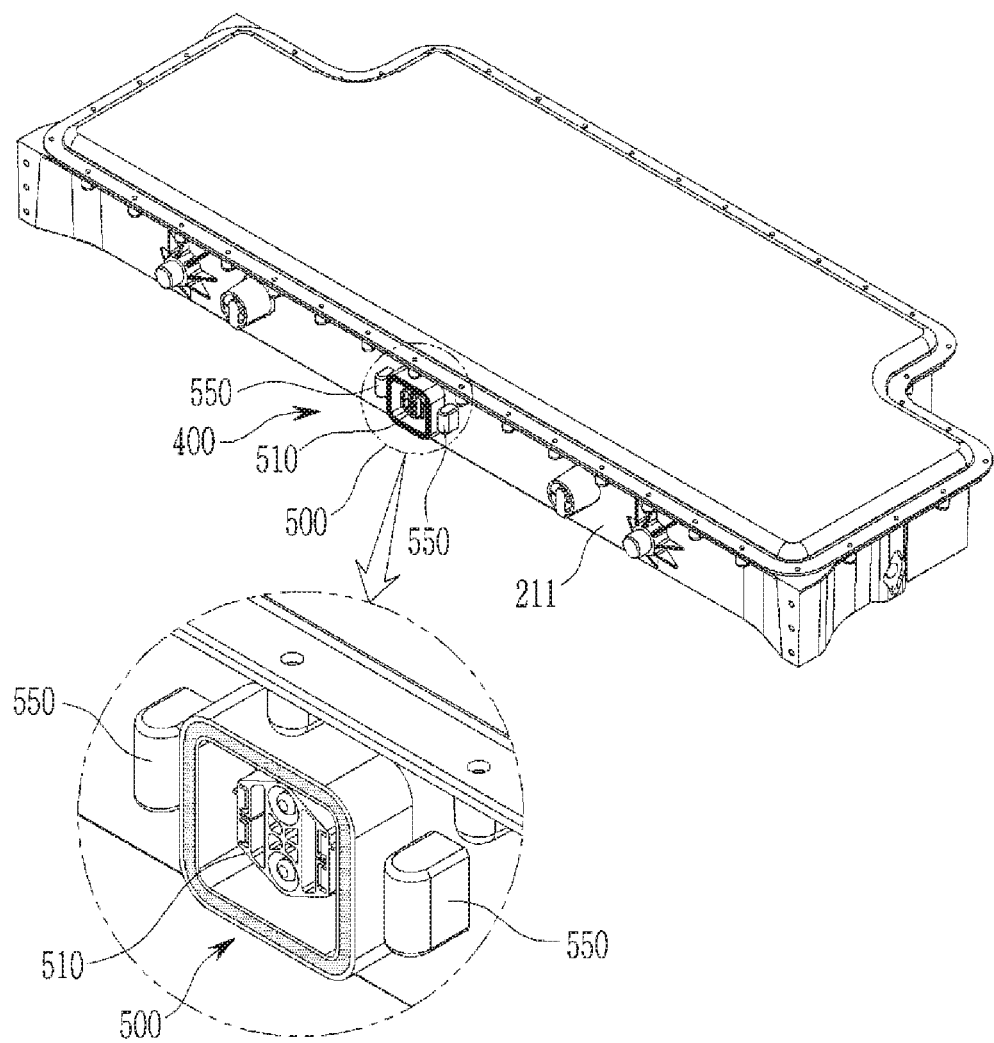
FIG. 4 is a diagram illustrating a male connector disposed on a first wall in the module of the battery according to the exemplary embodiment of the present invention.

Additionally, in an exemplary embodiment of the present disclosure, the coupling part 400 includes the connector 500, which connects the module housing 200 and the adjacent module housing 1001 electrically and by a signal. In an exemplary embodiment of the present disclosure, the connector 500 may include a male connector 510 and a female connector 530, and FIG. 3 illustrates the female connector 530 in the connector 500 and FIG. 4 illustrates the male connector 510.

In an exemplary embodiment of the present disclosure, by the connector 500, any one module housing 200 is mechanically coupled with the adjacent module housing 1001, and is also connected with the adjacent module housing 1001 electrically and by a signal.

In a related art general case, a module bus bar may be used for an electric connection between the cell stacks 100 when the module housings 200 are connected, and the module bus bar requires an operation to be electrically connected with the cell stack 100.

In the present disclosure, when the module housings 200 are coupled to each other, the connectors 500, which are provided in the module housings 200, respectively, are in contact with each other and are connected with each other, so that the module housings 200 may be connected electrically and by a signal even without a separate assembling process.

The cell stacks 100 of any one module housing 200 and the adjacent module housing 1001 may be electrically connected in a serial or parallel form by the electric connection through the connector 500, and a control management signal, such as an internal temperature and a voltage of each module housing 200, for managing the plurality of cell stacks 100 may be transmitted/received, so that it is possible to effectively operate the battery.

disclosure, in an exemplary embodiment of the present disclosure, the connector 500 may include the male connector 510, which is provided on a first wall 211 positioned in the second direction Y perpendicular to the first direction X in the outer wall 210 surrounding the internal space of the module housing 200, and the female connector 530, which is provided on a second wall 212 positioned at a side opposite to the first wall 211 in the outer wall 210 and is coupled with the male connector 510 of the adjacent module housing 1001.

The male connector 510 and the female connector 530 may be provided on the first wall 211 and the second wall 212 positioned in the second direction Y in the outer wall 210 of the module housing 200, respectively, and the male connector 510 and the female connector 530 may form a coupling relationship.

For example, the male connector 510 provided on the first wall 211 of the adjacent module housing 1001 may be inserted and coupled to the female connector 530 of the second wall 212 provided in any one module housing 200.

FIG. 3 illustrates the second wall 212 of the module housing 200 and the female connector 530 disposed on the second wall 212, and FIG. 4 illustrates the first wall 211 of the module housing 200 and the male connector 510 disposed on the first wall 211.

In an exemplary embodiment of the present disclosure, the plurality of cell stacks 100, each of which is formed of the plurality of unit cells 110 arranged in the first direction X, may be disposed in the first direction X, and thus, a coupling direction of the module housings 200 in the second direction Y prevents a length of a large pack from increasing.

Accordingly, the coupling parts 400 are disposed on the first wall 211 and the second wall 212 disposed in the second direction Y in the outer wall 210 of the module housing 200, respectively, and the male connector 510 and the female connector 530 may also be disposed on the first wall 211 and the second wall 212, respectively.

Figure 5:
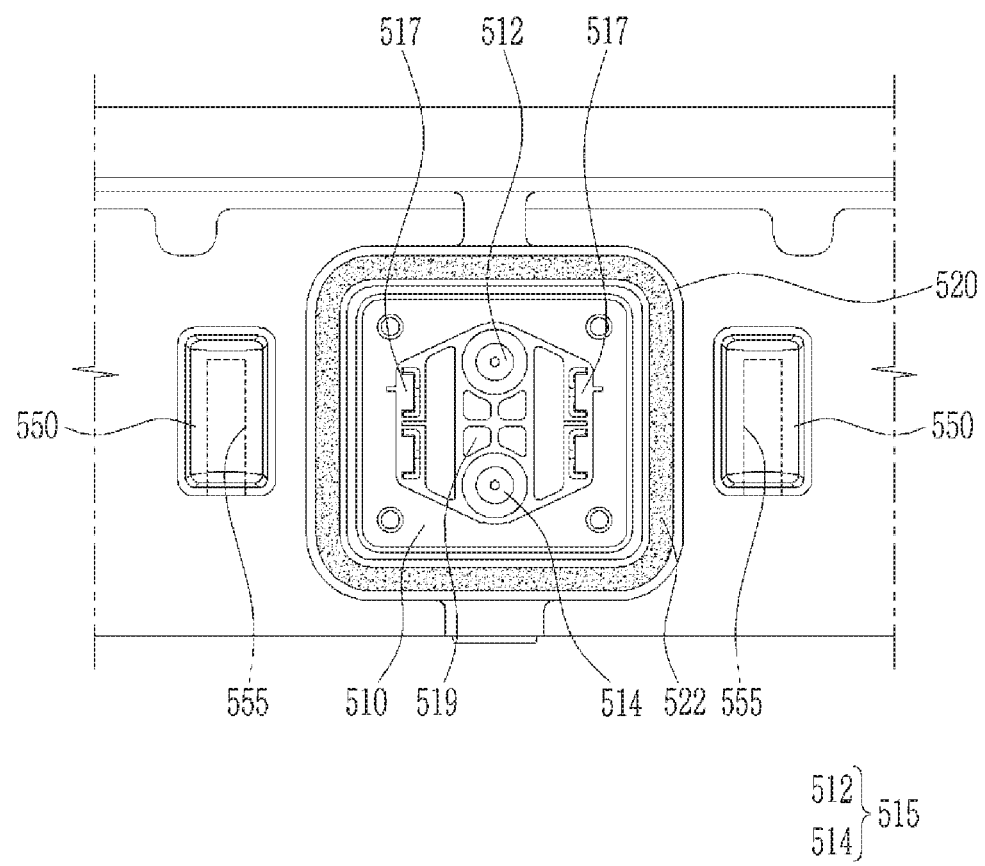
FIG. 5 is a diagram of the male connector in the module of the battery according to the exemplary embodiment of the present invention viewed from a front side.
Figure 6:
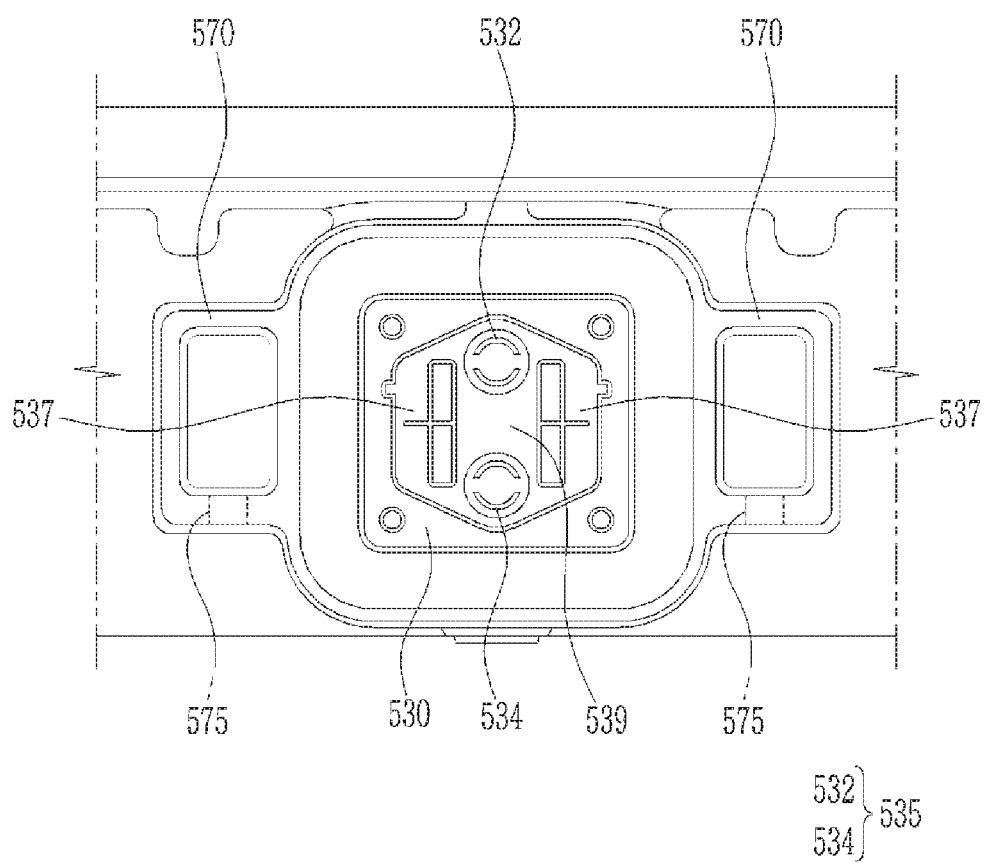
FIG. 6 is a diagram of a female connector in the module of the battery according to the exemplary embodiment of the present invention viewed from a front side.

FIG. 5 illustrates the male connector 510 viewed from the front side and FIG. 6 illustrates the female connector 530 viewed from the front side.

In an exemplary embodiment of the present disclosure, the male connector 510 may include a first electrical electrical connection part 515 (see FIG. 5) which protrudes in the second direction Y and is electrically connected with the cell stack 100 inside the module housing 200, and the female connector 530 may include a second electrical connection part 535 (see FIG. 6), which is indented in the second direction Y and into which the electrical connection part 515 of the male connector 510 of the adjacent module housing 1001 is inserted. The first and second electrical connection parts 515, 535 are configured to supply and/or receive current from the unit cells 100.

The male connector 510 and the female connector 530 may be connected with each other electrically and by a signal through the mutual coupling, and the male connector 510 may be formed with the electrical connection part 515, which is electrically connected with the cell stack 100 of the module housing 200.

Referring to FIGS. 5 and 6, each of the male connector 510 and the female connector 530 may have a base part formed of an insulating material, such as plastic or polymer, and may include a conductor material, which is exposed from the base part and is electrically connected to the cell stack 100.

The electrical connection part 515 may be electrically connected with the cell stack 100 inside the module housing 200, and may have the form, in which the electrical connection part 515 protrudes from the base part of the male connector 510 in the second direction Y, so that a conductive part is exposed to the outside.

The female connector 530 may include the electrical connection part 535. The electrical connection part 535 is a portion connected or coupled with the electrical connection part 515, and for example, the electrical connection part 535 may have the form of a recess, into which the electrical connection part 515, which is formed to protrude from the first wall 211, is inserted.

The female connector 530 is electrically connected with the cell stack 100 inside the module housing 200, and thus, when the female connector 530 provided in any one module housing 200 is connected with the male connector 510 of the adjacent module housing 1001, the cell stacks 100 inside any one module housing 200 and the adjacent module housing 1001 may be electrically connected together.

The female connector 530 may have the form in which a conductive part of the electrical connection part 535 formed of metal is exposed from the base part similar to the male connector 510, and the conductive part of the electrical connection part 535 may be electrically connected with the cell stack 100.

Figure 7:
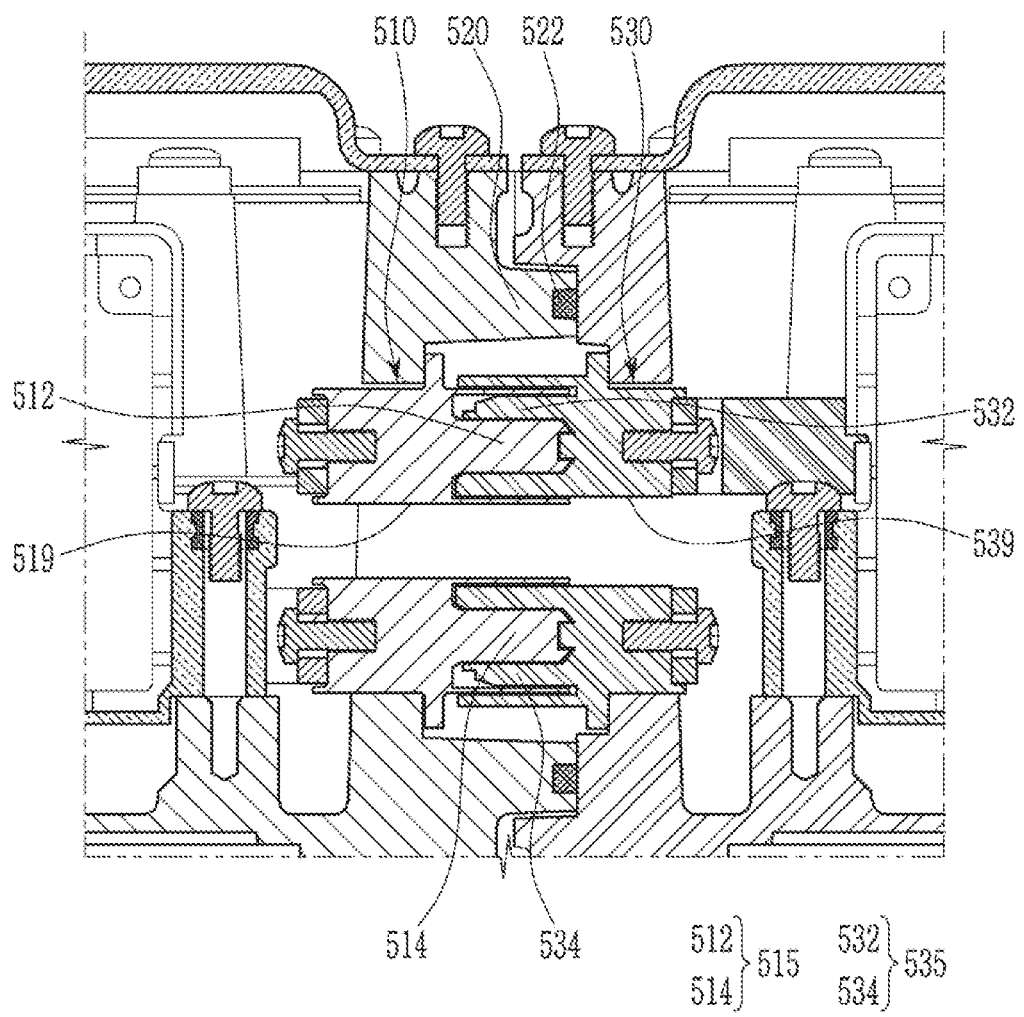
FIG. 7 is a cross-sectional diagram of a coupling state of the connectors in the battery module according to the exemplary embodiment of the present invention viewed from a lateral side.

FIG. 7 is a cross-sectional diagram of the coupling state of the male connectors 510 and the female connectors 530 of the different module housings 200 viewed from a lateral side.

Referring to FIG. 7, the electrical connection part 515 may have a protruding shape protruding from the first wall 211, and the electrical connection part 535 may have the form of the recess, into which the electrical connection part 515 is inserted. FIG. 7 illustrates the state where each of the electrical connection part 515 and the electrical connection part 535 is electrically connected with the cell stack 100 inside the corresponding module housing 200.

In an exemplary embodiment of the present disclosure, the male connector 510 may further include a signal connection unit 517 which protrudes in the second direction Y and transmits the management control signal of the cell stack, and the female connector 530 may further include a signal connection part 537, which is indented in the second direction Y and into which the signal connection part 517 of the male connector 510 of the adjacent module housing 1001 is inserted.

The signal connection part 517 and the signal connection part 537 are separate from the electrical connection part 515 and the electrical connection part 535, and a lower voltage may be formed in the signal connection part 517 and the signal connection part 537. For example, the signal connection part 517 and the signal connection part 537 may correspond to low voltage (LV) terminals, and the electrical connection part 515 and the electrical connection part 535 may correspond to high voltage (HV) terminals.

The signal connection part 517 may be formed of the plurality of conductive parts exposed from the base part of the female connector 510, and may have a shape of a plurality of pins or a metal plate. The signal connection part 517 may be connected with a control unit, which recognizes a temperature, a voltage, cooling information, and the like of the cell stack 100 and transceives the management control signal through a connection line that is a passage, through which the management control signal is transceived.

The signal connection part 537 may be provided in the shape corresponding to that of the signal connection part 517 so as to be coupled with the signal connection part 517 in the female connector 530. For example, when the signal connection part 517 has the plurality of pin shapes, the signal connection part 537 may have the plurality of recess shapes, into which the plurality of pins is inserted, and when the signal connection part 517 has the metal plate shape, the signal connection part 537 may have the metal plate shape surface facing the signal connection part 517.

The management control signal transceived through the signal connection part 517 and the signal connection part 537 may be variously utilized. For example, in the case of the large pack, in which the plurality of module housings 200 is coupled in the second direction Y, a control unit, which generalizes and manages/controls the large pack, may be disposed in any one module housing 200, and the management control signal collected from a sensor and the like of each module housing 200 may be transmitted to the control unit through the signal connection part 517 and the signal connection part 537 and be utilized for controlling the whole of the large pack.

In one or more embodiments, the control unit may be provided in each of the module housings 200, and the control unit provided in any one module housing 200 may recognize a temperature, a cooling situation, and the like of the adjacent module housing 1001 and utilize the recognized temperature, cooling situation, and the like in controlling cooling of any one module housing 200.

Figure 8:
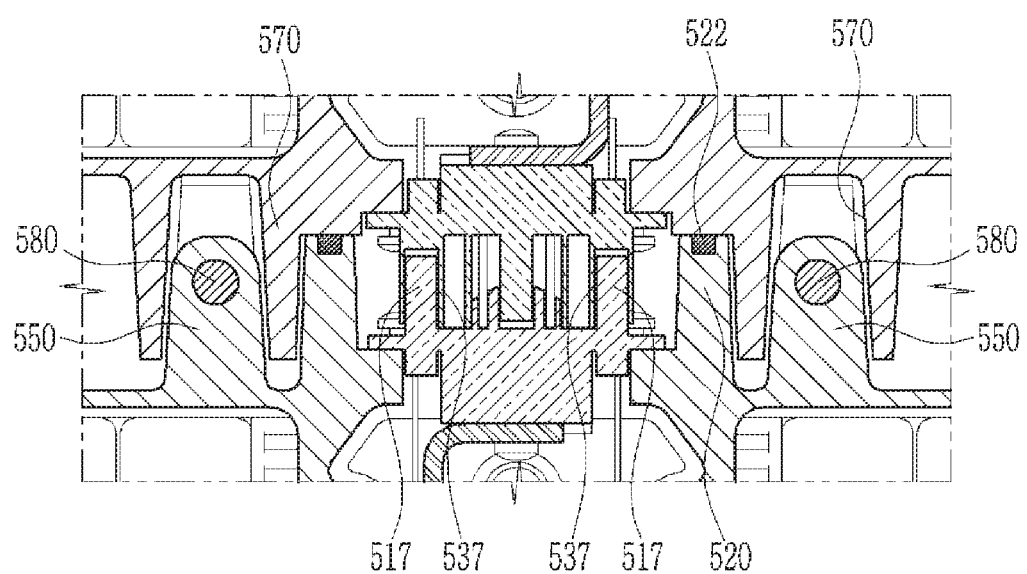
FIG. 8 is a cross-sectional diagram of a coupling state of the connectors in the battery module according to the exemplary embodiment of the present invention viewed from a top side.

FIG. 8 is a cross-sectional diagram of the coupling state of the male connector 510 and the female connector 530 viewed from a top side, and illustrates the state where the signal connection part 517 is provided in the shape protruding from the base part of the male connector 510 and the signal connection part 537 is provided in the form of the recess, into which the signal connection part 517 is inserted.

The connector 500 may be formed with communicating holes 519 and 539 at a center thereof, through which the internal side and the external side of the module housing 200 communicate with each other. The communicating holes 519 and 539 may be formed in the male connector 510 and the female connector 530, respectively, and the internal side and the external side of the module housing 200 may communicate with each other by the communicating holes 519 and 539.

Accordingly, even when an internal temperature of the module housing 200 is changed and the like, internal pressure may be stably maintained, and even when high-temperature gas is discharged from any one unit cell 110, the communicating holes 519 and 539 may be advantageous to safely maintain an internal environment.

Positions and shapes of the communicating holes 519 and 539 may be various, and FIGS. 5 and 6 illustrate the shapes of the communicating holes 519 and 539 positioned at the center parts of the base parts of the male connector 510 and the female connector 530.

In an exemplary embodiment of the present disclosure, the coupling part 400 may further include a guide protrusion 550, which is positioned in a lateral portion of the male connector 510 on the first wall 211 and protrudes in the second direction Y, and a guide recess 570, which is positioned in a lateral portion of the female connector 530 on the second wall 212 and into which the guide protrusion 550 of the adjacent module housing 1001 is inserted.

FIG. 5 illustrates the state where one pair of guide protrusions 550 is disposed at both sides of the male connector 510 according to an exemplary embodiment of the present disclosure. The shape and the number of guide protrusions 550 may be various, but according to an exemplary embodiment of the present disclosure, the guide protrusion 550 may protrude from the first wall 211 in the second direction Y, may extend in a height direction of the first wall 211, and may have a curved exterior surface so as to be easily inserted into the guide recess 570. That is, a shape of a cross-section of the guide protrusion 550 viewed from the top side may correspond to a part of a circle (e.g., an arc shape).

The guide recess 570 may correspond to the recess, into which the guide protrusion 550 is inserted, and may be formed to have a shape corresponding to the shape of the guide protrusion 550. Referring to FIG. 6, the guide recesses 570 according to an exemplary embodiment of the present disclosure may be positioned at both sides of the female connector 530, respectively, and may extend in the height direction of the second wall 212, and an indented surface of the guide groove 570 may correspond to a curved surface so as to correspond to the guide protrusion 550.

In one or more embodiments, it is advantageous to appropriately position the male connector 510 and the female connector 530 for the stable coupling of the pair of module housings 200 electrically and by a signal, and in an exemplary embodiment of the present disclosure, the guide protrusion 550 is inserted into the guide recess 570 during the process of coupling the pair of module housings 200 to have the correct position for coupling, and thus the male connector 510 and the female connector 530 may be accurately positioned and be coupled to each other.

In an exemplary embodiment of the present disclosure, a fastening recess 555 may be formed in the guide protrusion 550 in the height direction of the outer wall 210, a fastening hole 575 may be formed at a position corresponding to the fastening recess 555 on a lateral surface of the guide recess 570, and the guide protrusion 550 may be coupled with the guide recess 570 through the fastening member 580, which passes through the fastening hole 575 and is inserted into the fastening recess 555.

The guide protrusion 550 may extend in the height direction of the outer wall 210 (e.g., the first wall 211), and the fastening recess 555 may extend in the height direction of the first wall 211 and may be formed inside the guide protrusion 550. Further, the fastening hole 575 may be formed at the position corresponding to the fastening recess 555 on the lateral surface of the guide recess 570, into which the guide protrusion 550 is inserted.

When the guide protrusion 550 is inserted into the guide recess 570, the fastening member 580, such as a bolt, passes through the fastening hole 575 and is inserted into the fastening recess 555, so that the two module housings 200 may be firmly coupled to each other.

FIG. 8 illustrates a cross-section of the fastening member 580, which passes through the fastening hole 575 of the guide recess 570 and is inserted into the fastening recess 555 of the guide protrusion 550.

In FIGS. 5, 7, and 8, there is illustrated a seal supporting wall 520, which is extended along a border of the male connector 510, and protrudes in the second direction Y and is in close contact with the female connector 530 to seal the electrical connection part 515 and the signal connection part 517.

The seal supporting wall 520 may have the form of a lateral wall surrounding the regions around the electrical connection part 515 and the signal connection part 517, and an O-shaped sealing member (e.g., a gasket, such as an O-ring) 522, which is formed of a material, such as rubber, in order to improve sealing performance, may be provided at an end portion facing the female connector 530.

The sealing member 522 may have a closed section, such as an O-shape, and may protrude from the end portion of the seal supporting wall 520 and be pressed between the seal supporting wall 520 and the female connector 530 when the male connector 510 and the female connector 530 are coupled to each other.

The connector 500, to which a high-pressure current is transmitted and in which the management control signal is transceived, is sealed from the outside by the seal supporting wall 520 provided with the sealing member 522, thereby improving safety.

Figure 16:
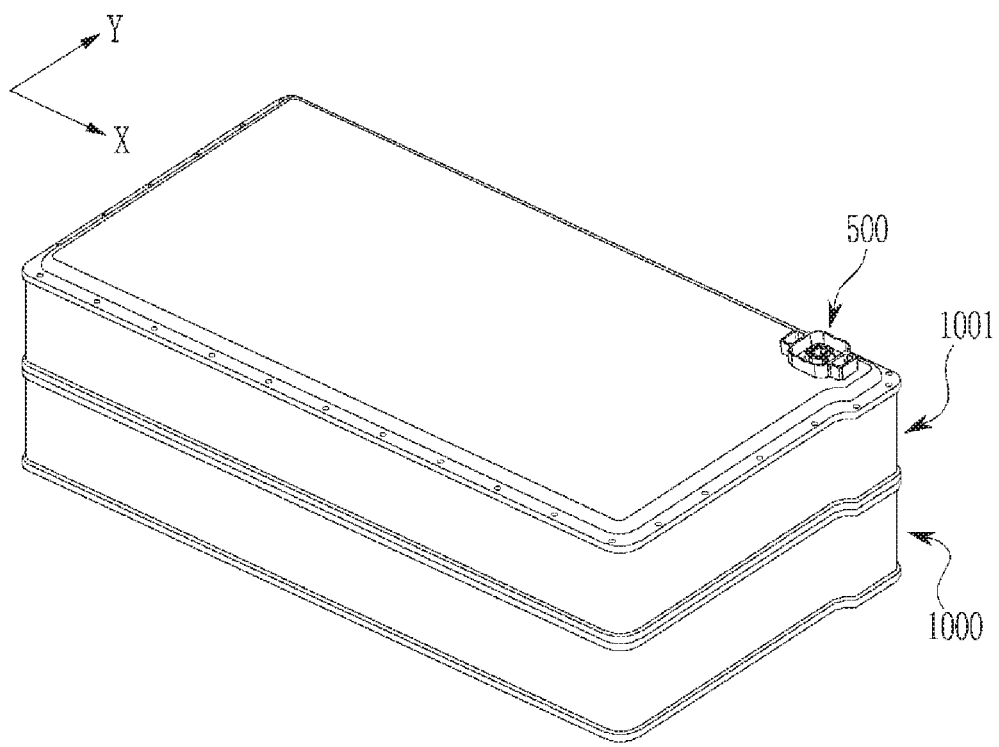
FIG. 16 is a diagram illustrating a state in which battery modules are combined with each other according to another exemplary embodiment of the present invention.

FIG. 16 is a diagram illustrating a state where the modules of the battery are combined with each other according to another exemplary embodiment of the present invention.

As shown in FIG. 16, the connectors 500 are formed on the upper surface (or module cover) and the bottom surface of the battery module, and the connectors 500 between the battery modules adjacent to each other are coupled to each other. Accordingly, the plurality of battery modules may be stacked in the vertical direction (directions perpendicular to the first direction X and the second direction Y) through the coupling parts 400.

For example, the male connector 510 disposed on the upper surface of the module housing (or module cover) of the battery module 1000 may be inserted into the female connector 530 disposed on the bottom surface of the adjacent module housing 1001.

Figure 9:
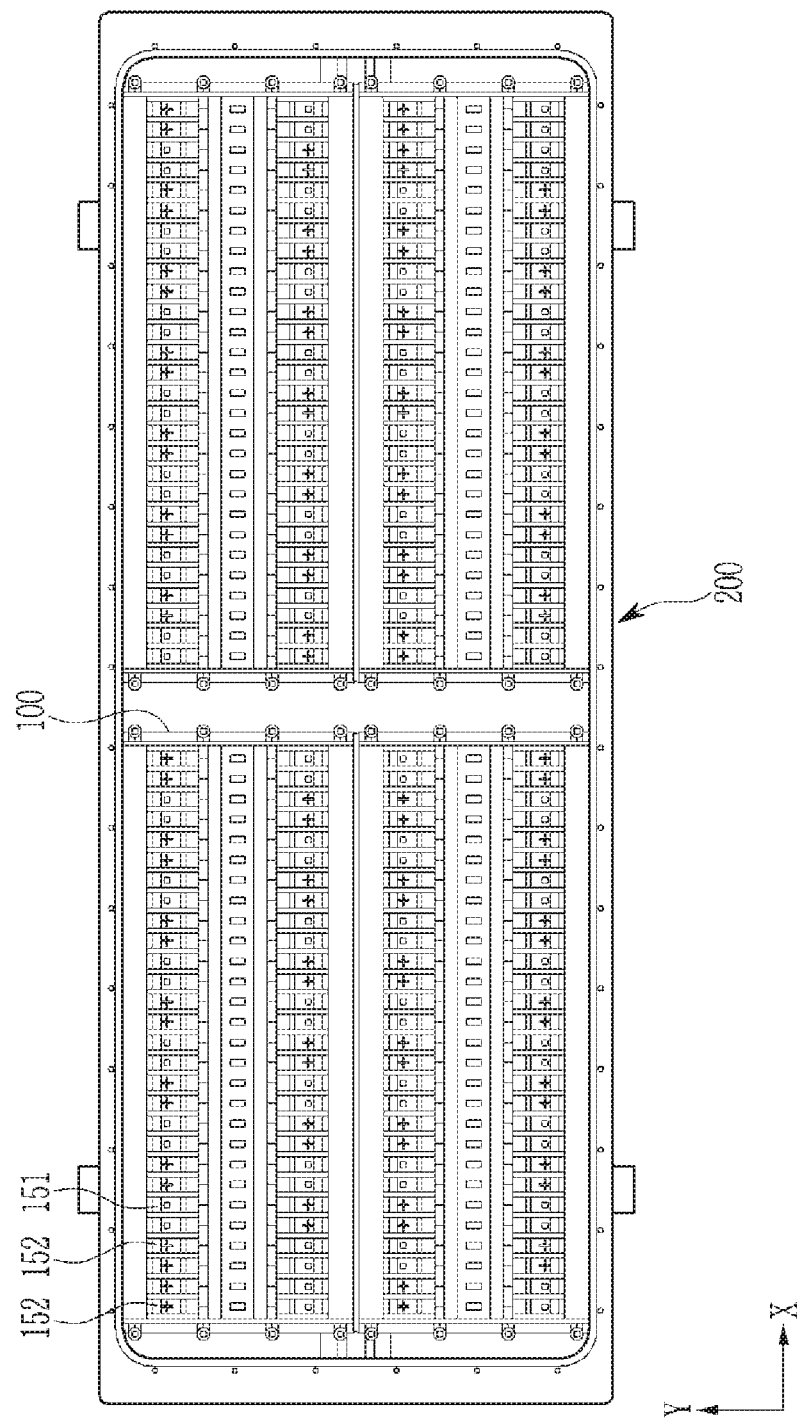
FIG. 9 is a diagram illustrating a structure, in which a plurality of unit cells is disposed, in the battery module of according to the exemplary embodiment of the present invention.
Figure 10:
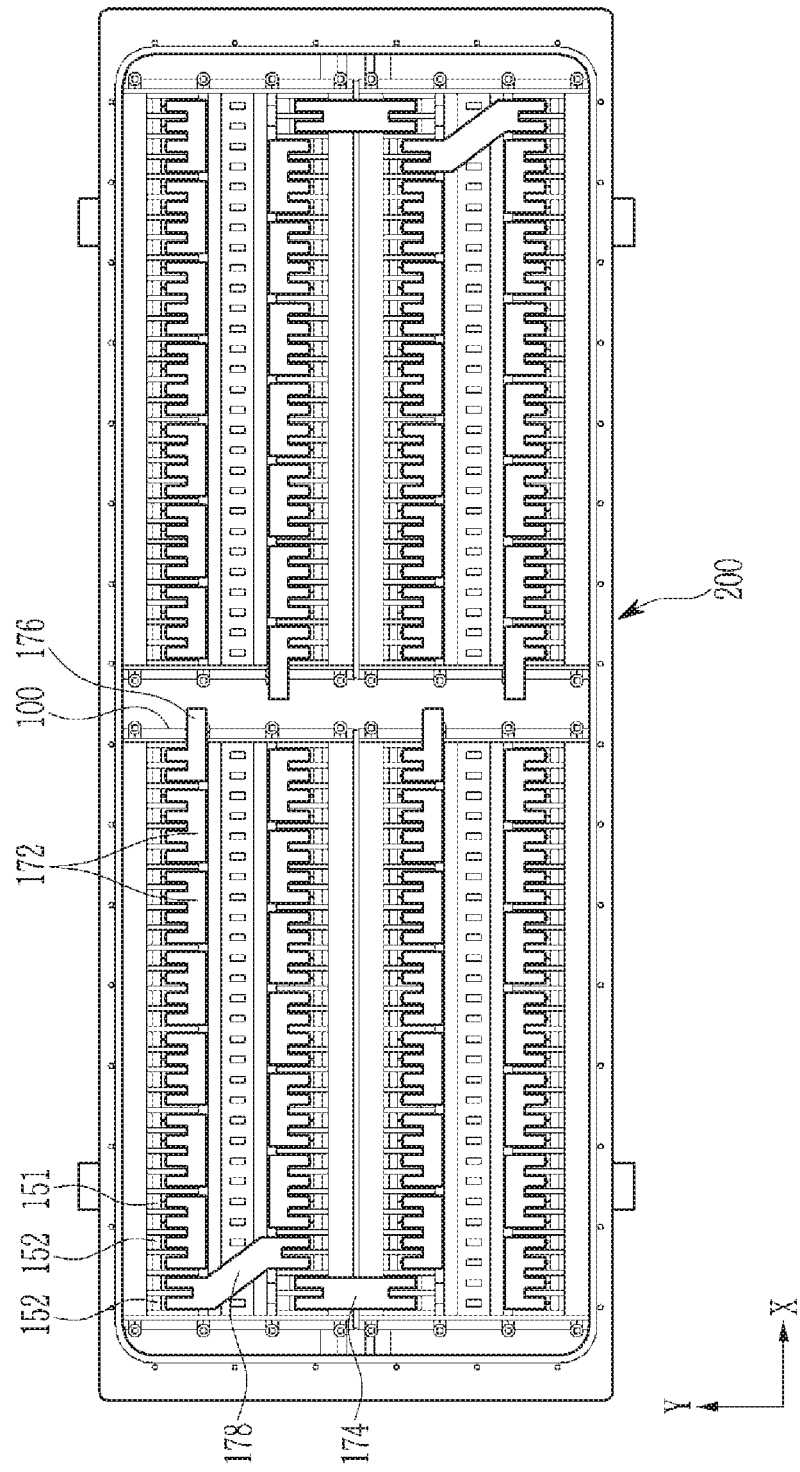
FIG. 10 is a diagram illustrating a state, in which a plurality of unit cells is connected through a bus bar, in the battery module according to the exemplary embodiment of the present invention.

FIG. 9 illustrates the plurality of unit cells 110 disposed inside the module housing 200, and FIG. 10 illustrates the structure, in which the plurality of unit cells 110 is electrically connected.

In an exemplary embodiment of the present disclosure, the receiving parts 220 are disposed so as to form a first column and a second column in the second direction Y, and the cell stacks 100 included in the first column may be electrically separated from the cell stacks 100 included in the second column.

Hereinafter, the columns of the receiving parts 220 or the cell stack 100 arranged in the second direction Y and spaced in the first direction X are defined as a first column and a second column, respectively. For convenience of the description, in FIG. 9, a left column among the columns arranged or extending in the second direction Y is described as a first column and a right column is described as a second column.

The cell stack 100 may be electrically connected with the cell stack 100 adjacent in the second direction Y, and may be electrically separated from the cell stack 100 adjacent in the first direction X. The cell stacks 100 adjacent in the second direction Y may be connected with each other in series or in parallel, and may also be connected to have both a partial parallel form and a partial serial form.

Further, the cell stacks 100 adjacent in the first direction X are electrically separated (e.g., electrically isolated) from each other. Referring to FIG. 10, the cell stacks 100 adjacent in the second direction Y among four cell stacks 100 are electrically connected through a connection bus bar 174, which is to be described below, but the cell stacks 100 adjacent to each other in the first direction X are not electrically connected with each other such that the cell stacks 100 have one-side terminal structures at both sides thereof.

Accordingly, in the present disclosure, even though the plurality of cell stacks 100 forms the plurality of columns, the plurality of cell stacks 100 maintains the electrically separated state, and it is easy to increase the number of cell stacks 100 as necessary, and it is possible to effectively provide power from the plurality of cell stacks 100 to an electric consuming device.

When the plurality of battery modules are coupled to each other to have the form of a large pack as described below, the battery module disposed at an end portion at a side opposite to the electric consuming device may be provided with a separate connection means for electrically connecting the cell stack 100 adjacent in the second direction Y, or may have an electric connection structure between the cell stacks 100 inside the module housing 200.

Additionally, referring to FIG. 10, the battery module 1000 according to an exemplary embodiment of the present disclosure may include the stack bus bars 172, which electrically connect the plurality of unit cells 110 in the cell stack 100, the connection bus bar 174, which electrically connects two cell stacks 100 adjacent in the second direction Y in the first column or the second column, and a terminal bus bar 176, which extends from the cell stack 100 and is connected with the first electrical connection part 515 or the second electrical connection part 535.

The stack bus bars 172 electrically connect the unit cells 110 included in any one cell stack 100. FIG. 10 illustrates the stack bus bars 172, which are alternately disposed on both sides of the unit cell 110, and which connect a set or predetermined number of unit cells 110 to each other.

That is, in the cell stack 100, the plurality of unit cells 110 may be electrically connected with each other through the stack bus bars 172, and the stack bus bar 172 may include a body part extending in the direction of the unit cell 110, and a leg part protruding from the body part and connected to the terminal unit 150 of each unit cell 110.

The connection bus bar 174 electrically connects the two adjacent cell stacks 100. In an exemplary embodiment of the present disclosure illustrated in FIG. 10, two cell stacks 100 are arranged in the second direction Y, and the connection bus bar 174 is disposed between the two cell stacks 100 to form an electric connection in the second direction Y.

One end portion of the connection bus bar 174 may be connected to the terminal unit 150 of the unit cell 110 disposed in any one cell stack 100, and the other end portion of the connection bus bar 174 may be connected to the terminal unit 150 provided in the unit cell 110 of the adjacent cell stack 100.

When the cell stacks 100 are serially connected with each other as illustrated in FIG. 10, the unit cells 110 adjacent in the second direction Y may be disposed so that different polarities face each other, and the connection bus bar 174 may connect the facing terminal units 150 of the unit cells 110 having one side facing each other in the second direction Y.

The terminal bus bar 176 extends from the cell stack 100 to serve as a terminal of a cell stack group. For example, when the two cell stacks 100 are connected with each other in the second direction Y as illustrated in FIG. 10, the terminal bus bar 176 extending from any one cell stack 100 may correspond to an input terminal and the terminal bus bar 176 extending from the remaining cell stack 100 (e.g., the other cell stack 100) may correspond to an output terminal.

The terminal bus bar 176 may be connected with the male connector 510 or the female connector 530 and also be electrically connected with the cell stack 100 inside the adjacent module housing 1001.

That is, in the present disclosure, even when the large pack is implemented by connecting the plurality of battery modules, an electric separation relationship between the cell stack 100 groups having different columns is maintained through the connection structure of the terminal bus bar 176 and the connector 500 to maintain the one-side terminal form.

Referring back to FIG. 7, in the battery module 1000 according to an exemplary embodiment of the present disclosure, the current connection unit 515 may include the first protrusion 512, which is electrically connected with the cell stacks 100 included in the first column, and the second protrusion 514 electrically connected with the cell stacks 100 included in the second column.

As described above, in an exemplary embodiment of the present disclosure, the cell stacks 100 of the first column are electrically separated (e.g., electrically isolated) from the cell stacks 100 of the second column, and in the electrical connection part 515, the first protrusion 512 is connected with the cell stacks 100 of the first column and the second protrusion 514 is connected with the cell stacks 100 of the second column.

The electrical connection part 535 may include a first accommodating part 532, which is electrically connected with the cell stacks 100 included in the first column and is coupled with the first protrusion 512 of the adjacent module housing 1001, and a second accommodating part 534, which is electrically connected with the cell stacks 100 included in the second column and is coupled with the second protrusion 514 of the adjacent module housing 1001, so as to correspond to the electrical connection part 515.

Accordingly, when the male connector 510 of the adjacent module housing 1001 is coupled to the female connector 530 provided in any one module housing 200, the first protrusion 512 connected with the cell stacks 100 of the first column of the adjacent module housing 1001 is transmitted to the first accommodating part 532 provided in the female connector 530 of the corresponding module housing 200, and a current transmitted to the first accommodating part 532 may pass the cell stacks 100 of the first column of the corresponding module housing 200 again and be transmitted through the first protrusion 512 in the male connector 510 of the corresponding module housing 200.

That is, in an exemplary embodiment of the present disclosure, in the male connector 510, the first protrusion 512 and the second protrusion 514 may be separated and provided so that the cell stacks 100 of the first column and the second column are electrically separated and effectively connected with the adjacent module housing 1001, and further, in the female connector 530, the first accommodating part 532 and the second accommodating part 534 may be separated and provided in order to electrically separate the cell stacks 100 of the first column and the second column.

As illustrated in FIG. 9, in the cell stack 100, the terminal bus bar 176 is connected to one end portion of the unit cell 110 and the connection bus bar 174 is connected to the other end portion of the unit cell 110, and the cell stack 100 is oriented so that the one end portion faces a space between the first column and the second column, and the terminal bus bar 176 may be extended to the space between the first column and the second column.

The terminal bus bar 176 may be connected to the outside through the connector 500, and the connection bus bar 174 may become a connection means, which connects the cell stacks 100 adjacent in the second direction Y to each other.

Accordingly, in an exemplary embodiment of the present disclosure, the terminal bus bar 176 is connected to one end portion of the unit cell 110 of the cell stack 100 and the connection bus bar 174 is connected to other end portion of the unit cell 110 of the cell stack 100 to implement a structure, which effectively connects the plurality of unit cells 110 forming the cell stack 100 as a whole.

In an exemplary embodiment of the present disclosure, portions of the cell stacks 100 of the first column and the second column facing each other in the first direction X correspond to the end portions to which the terminal bus bars 176 are connected, so that the terminal bus bars 176 may be between the first column and the second column. As described below, a spaced space between the first column and the second column may correspond to a second impact absorption space 216.

When the terminal bus bar 176 serving as a terminal for the outside in an assembly of the plurality of unit cells 110 is disposed at a center between the first column and the second column, the connector 500, which is connected with the terminal bus bar 176 and is disposed outside the module housing 200, may be located at the center of the module housing 200 (e.g., the center of first wall 211 or the second wall 212), and thus it is possible to efficiently configure an electric connection structure between the plurality of battery modules or an electric connection structure with an electric consuming device.

As illustrated in FIG. 10, the terminal bus bars 176 extending from the cell stacks 100 of the first column and the terminal bus bars 176 extending from the cell stacks 100 of the second column may be alternately arranged in the second direction Y.

In consideration of the structure of the present disclosure, in which the receiving parts 220 are arranged in the first direction X and the second direction Y, when the terminal bus bars 176 face each other even though the cell stacks 100 adjacent in the first direction X are electrically separated from each other, there is a possibility in that a short-circuit may be incurred due to a high voltage formed in the terminal bus bars 176.

Further, the terminal bus bars 176 between the cell stacks 100 disposed in the second direction Y have different polarities, so that when the cell stacks 100 are disposed closely, there is a possibility in that a short-circuit may occur.

Accordingly, in one or more embodiments of the present disclosure, even when the plurality of cell stacks 100 is provided in one module housing 200 while forming the plurality of columns, such as the first column and the second column, in order to prevent a short-circuit situation from being generated between the terminal bus bars 176, the terminal bus bars 176 of the first column are prevented from facing the terminal bus bars 176 of the second column, and simultaneously the terminal bus bars 176 of the first column are disposed to be adjacent to each other or the terminal bus bars 176 of the second column are not disposed to be adjacent to each other.

Referring to FIG. 10, the four terminal bus bars 176 disposed at the center may be sequentially disposed in an order of the terminal bus bar 176 of the first column, the terminal bus bar 176 of the second column, the terminal bus bar 176 of the first column again, and the terminal bus bar 176 of the second column again from the top (e.g., the terminal bus bars 176 connected to the cell stacks 100 of the first and second columns are alternately arranged).

In the battery module 1000 according to an exemplary embodiment of the present disclosure, the plurality of unit cells 110 in the cell stack 100 is divided into a plurality of cell groups formed of one or more unit cells 110, of which the terminal units 150 having the same polarity face in the first direction X, and the stack bus bar 172 may be extended in the first direction X and may serially connect two cell groups, which are adjacent to each other and are disposed so that the terminal units 150 having different polarities face in the first direction X.

The cell stack 100 is formed of the plurality of unit cells 110, and the plurality of unit cells 110 may configure the plurality of cell groups, and the plurality of cell groups may configure the cell stack 100. In an exemplary embodiment of the present disclosure, the cell group means a group of the unit cells 110, which is disposed so that the terminal units 150 having the same polarity face each other in the first direction, among the plurality of unit cells 110 adjacent in the first direction.

Referring to FIG. 10, it can be seen that every two unit cells 110, in which the terminal units 150, for example, the first terminals 151, having the same polarity face each other, are disposed in each cell stack 100, and for example, the second terminal 152 is disposed after the first terminal 151 so that the polarity is changed for every two unit cells 110, which means in an exemplary embodiment, two unit cells 110 form one cell group.

The number of unit cells 110 constituting the cell group in the whole cell stack 100 may be the same, but the number of unit cells 110 configuring the cell group may vary from one to two or more as desired.

The stack bus bar 172 extends in the first direction X and connects the facing terminal units 150 to each other in the adjacent unit cells 110. That is, the unit cells 110 constituting the cell group by the stack bus bar 172 are connected to each other in parallel, and the adjacent cell groups are connected serially.

In the battery module 1000 according to an exemplary embodiment of the present disclosure, in any one of the two cell stacks 100 electrically connected through the connection bus bar 174, two adjacent cell groups among the plurality of cell groups may be disposed so that the terminal units 150 having the same polarity face each other.

Further, the battery module 1000 according to an exemplary embodiment of the present disclosure may further include a cross bus bar 178, which extends so as to cross the first direction X and serially connect the two adjacent cell groups, of which the terminal units 150 having the same polarity face each other.

Referring to FIG. 10, there is illustrated the state where the cell group adjacent to the cell group connected with the connection bus bar 174 in the cell stack 100 illustrated at the upper side of the first column in the drawing is disposed so that the terminal units 150, for example, the first terminals 151, having the same polarity face each other.

As described above, in order to prevent a short-circuit situation and the like between the terminal bus bars 176 due to a high voltage, the terminal bus bars 176 connected to the cell stacks 100 that are adjacent to each other in the second direction Y may not face each other (e.g., terminal bus bars 176 of the first column do not face the terminal bus bars 176 of the second column), and the use of the cross bus bar 178 may be advantageous to implement this arrangement of the terminal bus bars 176.

For example, regardless of the number of unit cells 110 configuring the cell group, when the unit cells 110 of the cell stack 100 are electrically connected by using only the stack bus bar 172 in the cell stack 100 having the same number of unit cells 110, there may occur the case where the terminal bus bars 176 of the cell stacks 100 adjacent in the second direction Y are adjacent to each other.

However, in any one of the two cell stacks 100 connected through the connection bus bar 174, when the adjacent cell groups are disposed so that the terminal units 150 having the same polarity face each other and the two cell groups are serially connected in the direction crossing the first direction X, it is possible to prevent the situation where the terminal bus bars 176 of the cell stacks 100 adjacent in the second direction Y are adjacent to each other.

FIG. 3 illustrates the case where the cell group adjacent to the cell group connected with the connection bus bar 174 in the cell stack 100 at the upper side of the first column and the second column is disposed so that the terminal units 150 having the same polarity face in the first direction X, and FIG. 4 illustrates the cross bus bar 178, which crosses the first direction and serially connects the two cell groups.

As illustrated in FIG. 4, in the battery module 1000 according to an exemplary embodiment of the present disclosure, both the connection bus bar 174 and the cross bus bar 178 may be connected together in the unit cell 110 at the other end portion in the cell stack 100. Accordingly, in an exemplary embodiment of the present disclosure, it is possible to more effectively set the structure of the connection bus bar 174, the stack bus bar 172, and the cross bus bar 178.

Referring back to FIGS. 1 and 2, in the battery module 1000 according to an exemplary embodiment of the present disclosure, the fixed wall 250 may include a separation wall 230, which crosses the internal space surrounded by the outer wall 210 of the module housing 200 in the first direction X and is in contact with a side surface of the cell stack 100, and end walls 240, which are disposed at opposite ends in the first direction X and press the end surfaces at opposite ends of the cell stack 100 in the first direction X, respectively.

The separation wall 230 extends in the first direction X, and divides the internal space surrounded by the outer wall 210 to form the plurality of receiving parts 220. Further, the separation wall 230 constitutes a part of the fixed wall 250 of the two receiving parts 220 disposed at opposite sides in the second direction Y, and may be in contact with the side surfaces of the cell stacks 100 inserted into the two receiving parts 220, respectively.

The side surfaces means both side surfaces extending in the first direction X among the lateral surfaces of the cell stack 100, (i.e., the side surfaces of the cell stack 100 spaced apart from each other in the second direction Y), and as described above, the cell stack 100 of the present disclosure does not include a separate module frame, so that the side surfaces may correspond to the insulation member 112 surrounding the lateral surfaces of the plurality of unit cells 110.

The separation wall 230 may be provided in the form protruding from the floor surface 260 of the module housing 200 in the upper direction, and may be provided so as to divide the internal space of the module housing 200 while extending in the first direction X. That is, the separation wall 230 may correspond to a part, that is, one surface, of the fixed wall 250 around (or surrounding) the receiving part 220.

Referring to FIGS. 1 and 2, the receiving parts 220 are formed at both sides of the separation wall 230, and the separation wall 230 is the fixed wall 250 for the two receiving parts 220 existing at both sides of the separation wall 230.

Referring to FIG. 2, the separation wall 230 faces the side surface of the cell stack 100 inserted into the receiving part 220, and thus, the separation wall 230 corresponding to a part of the fixed wall 250 is in direct contact with at least a part of the side surface of the cell stack 100 inserted into the receiving part 220 to support the cell stack 100 in the second direction Y.

The end walls 240 extend in the second direction Y and are disposed at both ends of each of the plurality of receiving parts 220 in the first direction X to press the end surfaces at opposite ends of the cell stack 100 in the first direction X, and may correspond to a part of the fixed wall 250.

In one or more embodiments of the present disclosure, the lateral surfaces at opposite ends in the first direction X in the cell stack 100 are defined as the end surfaces. According to an exemplary embodiment of the present disclosure, the end surface may correspond to the insulation member 112 or one surface of the end support 120.

FIGS. 1 and 2 illustrate the state where the end walls 240 are disposed at both end of the cell stack 100 in the first direction X. The plurality of end walls 240 may be present within the module housing 200, and may correspond to both ends of the fixed wall 250 of the receiving part 220 in the first direction X.

The end wall 240 may be separate from the outer wall 210 of the module housing 200. For example, the end walls 240 have a shape protruding from the floor surface 260 in the internal space of the module housing 200 and extend in the second direction Y, and the plurality of end walls 240 may be disposed so that one surface of the end wall 240 is spaced apart from the outer wall 210 facing end wall 240 or is spaced apart from the end wall 240 of the other receiving part 220 facing the end wall 240.

FIG. 1 illustrates the state where a total of four receiving parts 220 are provided, that is, two receiving parts 220 are provided in the first direction X and two receiving parts 220 are provided in the second direction Y according to one exemplary embodiment of the present disclosure, and one separation wall 230 crossing a part of the internal space of the module housing 200 in the first direction X and four end walls 240 extended in the second direction Y are provided.

The separation wall 230 is shared by the receiving parts 220 disposed at both sides in the second direction Y, the end wall 240 is not shared in both sides in a longitudinal direction, and in each of the two receiving parts 220 facing in the first direction X, the end walls 240 are disposed while being spaced apart from each other with one surface facing each other.

At least a part of each of the pair of end walls 240 disposed at both end of the receiving part 220 in the first direction X is in direct contact with the end surface of the cell stack 100, for example, one surface of the end support 120. Further, the end wall 240 may be disposed to press the cell stack 100 in the first direction X.

As described above, in an exemplary embodiment of the present disclosure, the cell stack 100 inserted into the receiving part 220 is not fastened with a module frame, such as an end block or a side plate, but is provided in the form of which the lateral surfaces may be surrounded by the insulation member 112 in the state where the plurality of unit cells 110 is arranged, and in the battery module 1000 according to the exemplary embodiment of the present invention, the end walls 240 may serve to press and fix the cell stack 100 in the first direction X.

The cell stack 100 is pressed in the first direction X to provide higher power under the same volume, and may be maintained in a structurally stable state.

The cell stack 100 may be inserted between the fixed walls 250 of the receiving part 220, and in the illustrated embodiment, between the pair of end walls 240 provided at both ends in the first direction X. The pair of end walls 240 may press the end surfaces through a zig inserted into the receiving part 220, and the end walls 240 may maintain a pressed state of the cell stack 100.

Figure 11:
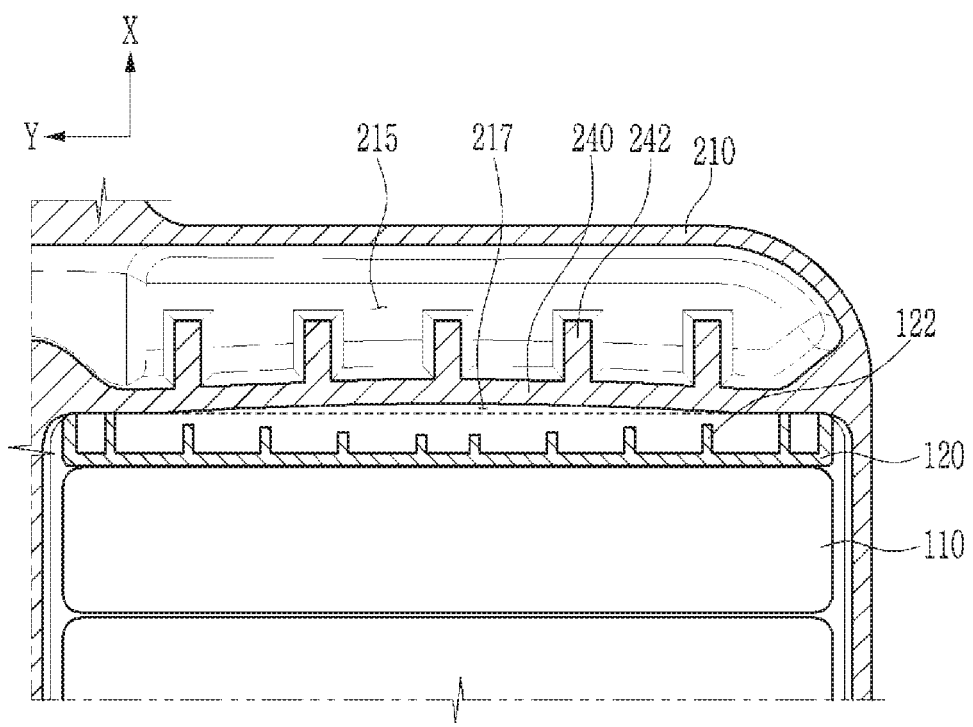
FIG. 11 is a diagram illustrating an end wall and an end support in the battery module according to the exemplary embodiment of the present invention.

FIG. 11 illustrates a cross-section of the end wall 240 spaced apart from the outer wall 210 of the module housing 200. As illustrated in FIG. 11, in an exemplary embodiment of the present disclosure, the end wall 240, which is disposed so that one surface faces the outer wall 210 of the module housing 200, may be spaced apart from the outer wall 210 in the first direction X and form the first impact absorption space 215 between the end wall 240 and the outer wall 210.

In an exemplary embodiment of the present disclosure, the plurality of end walls 240 may be provided as illustrated in FIGS. 1 and 2, the end wall 240 facing the outer wall 210 among the plurality of end walls 240 may be spaced apart from the outer wall 210 of the module housing 200 facing the end wall 240 in the first direction X and form the first impact absorption space 215 between the end wall 240 and the outer wall 210 as illustrated in FIG. 11.

FIG. 11 illustrates the end wall 240 among the end walls 240 facing the outer wall 210 of the module housing 200 viewed from the top side, and illustrates the first impact absorption space 215 formed between the end wall 240 and the outer wall 210.

The module housing 200 needs to safely protect the cell stack 100 inserted into the receiving part 220 against the impact transferred from the outside, and in an exemplary embodiment of the present disclosure, the end wall 240, which is in direct contact with the end surface of the cell stack 100 and supports and presses the cell stack 100, is spaced apart from the outer wall 210, thereby preventing the impact transferred to the outer wall 210 from being directly transferred to the end wall 240.

Further, it is necessary to appropriately cool the unit cell 110 heating during use, and the first impact absorption space 215 itself may advantageously serve as a heat radiating space, in which heat of the cell stack 10 is dispersed.

In the exemplary embodiment of the present disclosure, as illustrated in FIGS. 1 and 2, the plurality of receiving parts 220 is disposed in the internal space of the module housing 200 in the first direction X, and in two receiving parts 220 adjacent in the first direction X, the end walls 240 disposed on end surfaces facing in the first direction X are spaced apart from each other to form the second impact absorption space 216 between the end walls 240 of the receiving parts 220 adjacent in the first direction X. Further, the terminal bus bars 176 may be extended to the second impact absorption space 216.

In FIG. 1, in each of the two receiving parts 220 adjacent to each other in the first direction X, one surface, in which the fixed wall 250 of one receiving part 220 faces the fixed wall 250 of the other receiving part 220, corresponds to the end wall 240, and the two receiving parts 220 have different end walls 240 defining the facing surfaces thereof. That is, the receiving parts 220 arranged in the first direction X do not share the end wall 240.

Referring to FIG. 2, it is illustrated the case where in the two receiving parts 220 arranged in the first direction X, the end walls 240 of the facing surfaces are spaced apart from each other, and the second impact absorption space 216 is formed between the end walls 240.

The second impact absorption space 216 protects the cell stack 100 inserted into the corresponding receiving part 220 from the impact transferred from the outside of the receiving part 220, like the first impact absorption space 215. For example, the first impact absorption space 215 may suppress the impact transferred form the outer wall 210 of the module housing 200 from being transferred to the internal space of the module housing 200, and the second impact absorption space 216 may suppress the impact transferred to any one receiving part 220 from being transferred to the other receiving part 220 adjacent in the first direction X.

Further, as described above, in the exemplary embodiment of the present invention, the terminal bus bars 176 extend from the cell stacks 100 of the first column and the second column, and the second impact absorption space 216 may correspond to the space, in which the terminal bus bars 176 are disposed.

In an exemplary embodiment of the present disclosure, the cell stack 100 further includes one pair of end supports 120, which is disposed at opposite end portions in the first direction X and of which an exterior surface corresponds to the end surface. The end wall 240 is bent toward the outside such that a center portion of the end wall 240 is further from the facing end surface, and the end surface is indented inwardly such that a center portion of the end surface is further from the facing end wall 240, so that a swelling space 217 may be formed between the outwardly bent end wall 240 and the inwardly indented end surface of the cell stack 100.

As illustrated in FIGS. 2 and 9, in the battery module 1000 according to an exemplary embodiment of the present disclosure, the cell stack 100 may further include one pair of end supports 120, which is disposed at opposite end portions in the first direction X and of which an exterior surface corresponds to the end surface of the cell stack 100.

In an exemplary embodiment of the present disclosure, the plurality of unit cells 110 is provided in the form of which at least the lateral surface is surrounded by the insulation member 112, and the end supports 120 may be disposed in the form in which the interior surface of each of the end supports 120 is in surface contact with the insulation member 112 at both ends of the cell stack 100 in the first direction X. However, a positional relationship between the insulation member 112 and the end support 120 is not essentially limited thereto. FIG. 11 illustrates the end surface of the end support 120.

The end supports 120 are disposed at both ends of the cell stack 100 in the first direction X, and the exterior surfaces of the end supports 120 may correspond to the end surfaces. The end support 120 may serve to absorb impact between the end wall 240 and the outermost cell, and may serve to uniformly transfer pressing force of the end wall 240 to the outermost cell 110 of the cell stack 100.

The outermost cell means the unit cell 100 positioned at the outermost side in the first direction X among the plurality of unit cells 110 constituting the cell stack 100, and in n exemplary embodiment of the present disclosure, the outermost cell is disposed at each of both ends in the first direction X among the plurality of unit cells 110.

Even though the end wall 240 does not press the end support 120 with the entire surface thereof because the end wall 240 has the bent shape and the like, the end support 120 may press the insulation member 112 and the exterior surface of the outermost cell with the entire surface thereof.

Figure 12:
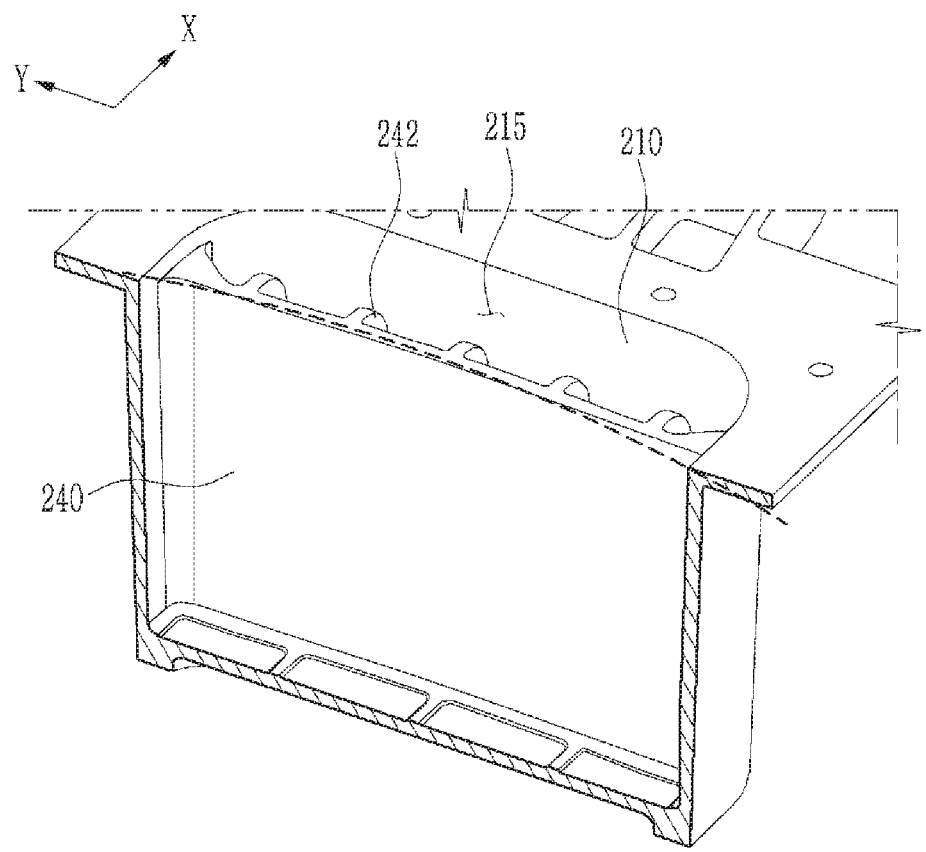
FIG. 12 is a diagram illustrating a shape of the end wall in the battery module according to the exemplary embodiment of the present invention.
Figure 13:
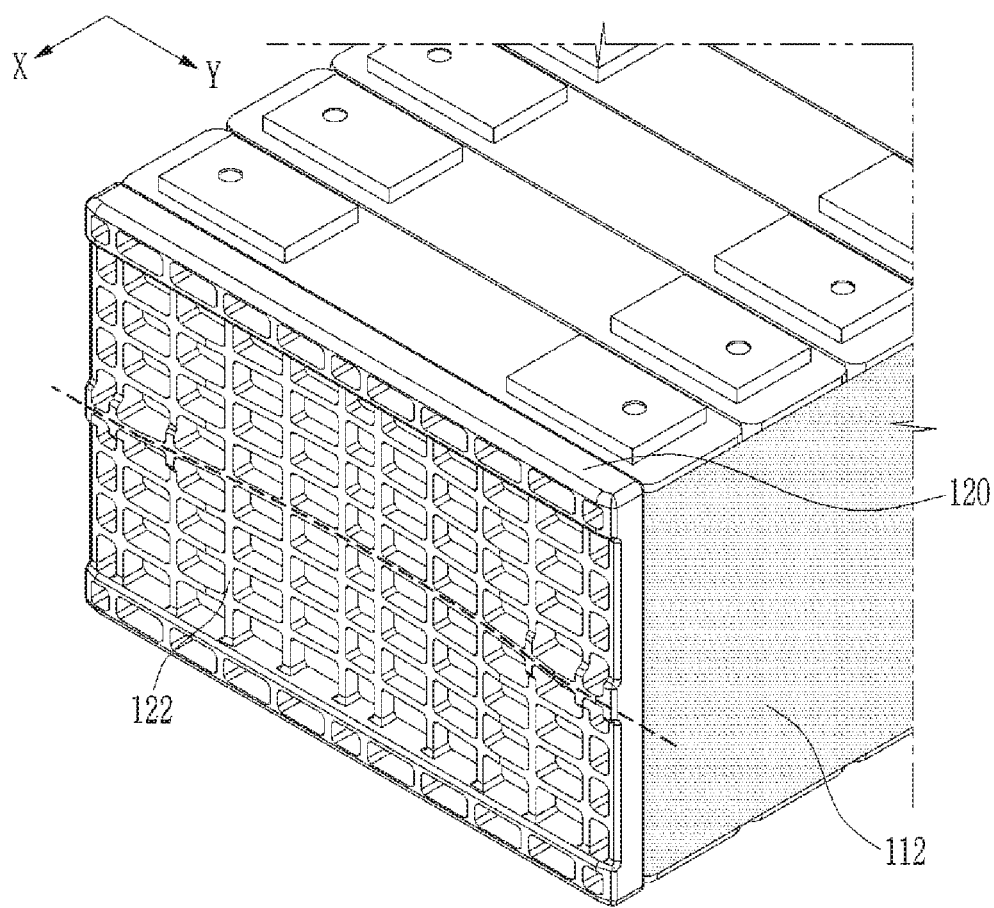
FIG. 13 is a diagram illustrating an end surface of the end support in the battery module according to the exemplary embodiment of the present invention.

FIG. 11 illustrates the cross-section of the end wall 240, which is bent so that the center portion is further from the end surface, and FIG. 12 illustrates the interior surface looking toward the end surface of the cell stack 100 in the bent end wall 240.

The end wall 240 is bent to the outside so that the center portion of the end wall 240 is further from the end surface facing the end wall 240, such that the swelling space 217 may be formed between the end wall 240 and the end surface. The end wall 240 may be formed in the shape bent so that the center portion of the end wall 240 is further from the end surface of the cell stack 100.

In the end wall 240 according to one or more embodiments, only the center portion may be concavely indented in the second direction Y and the height direction, but in one or more embodiments the end wall 240 may be bent so that the cross-section of the end wall 240 is curved, as illustrated in FIG. 11.

The end wall 240 has the bent shape, so that a space is formed at least the center portion between the end wall 240 and the end surface of the cell stack 100, and the corresponding space corresponds to the swelling space 217 in an exemplary embodiment of the present disclosure.

In the unit cell 110 constituting the cell stack 100, a swelling phenomenon, in which gas is generated from the internal electrode assembly and is expanded, may be generated according to deterioration of durability by the use and a peripheral situation, and the implementation of the structure, which is capable of appropriately treating the swelling, is beneficial in the structure, in which the plurality of unit cells 110 is arranged.

When the swelling phenomenon occurs, the unit cell 110 has a large amount of expansion in the center portion of the lateral surface positioned in the first direction X, and thus, in an exemplary embodiment of the present disclosure, the swelling space 217 is formed between the end wall 240 and the end surface so as to accommodate the expansion of the volume of the cell stack 100 when the swelling phenomenon of the cell stack 100 occurs.

As described above, pressure on the cell stack 100 in the first direction X increases efficiency, such as energy density, and in an exemplary embodiment of the present disclosure, even though the center portion of the end wall 240, which presses the end surface, is bent outward (e.g., curved outward), both end portions of the end wall 240 maintain the state of pressing the end surfaces of the cell stack 100, which is advantageous to operate the cell stack 100.

As illustrated in FIG. 11, the end surface of the end support 120 may be indented inwardly such that the center portion of the end surface is further from the end wall 240 facing the end support 120. That is, the end wall 240 may have the shape in which the center portion of the end surface is indented.

The end surface corresponding to the exterior surface of the end support 120 may have the shape in which the center portion of the end surface is indented inwardly such that a space is formed in at least the center portion between the end surface and the end wall 240 similar to the end wall 240 having the bent shape, and thus the swelling space 217 may be formed in at least the center portion between the end support 120 and the end wall 240.

In an exemplary embodiment of the present disclosure, the end wall 240 may include a plurality of first ribs 242, which extend in a height direction of the end wall 240 on the exterior surface and are spaced apart from each other in the second direction Y. The end support 120 may include a plurality of second ribs 122, which are spaced apart from each other in the second direction Y and a height direction of the end support 120 so as to form a lattice shape in the end surface.

As illustrated in FIGS. 2 and 9, the plurality of first ribs 242 may be formed on the end wall 240 according to an exemplary embodiment of the present disclosure. The end wall 240 may include the plurality of first ribs 242 on the exterior surface.

In one or more embodiments, the end wall 240 is strong against impact from the outside while pressing the end surface of the cell stack 100. In one or more embodiments, even when the swelling space 217 is formed, the end wall 240 has mechanical strength by which the end wall 240 is prevented from being damaged.

Accordingly, in an exemplary embodiment of the present disclosure, as illustrated in FIGS. 2 and 7, the plurality of first ribs 242 may be provided in the exterior surface of the end wall 240, that is, one surface facing the outer wall 210 or a surface opposite to the cell stack 100.

The first ribs 242 are formed on the exterior surface of the end wall 240 for protecting the cell stack 100. The exterior surface of the end wall 240 means a surface facing away from the end support 120. The first ribs 242 may be separately manufactured and be coupled to the end wall 240, or the first ribs 242 may be integrally formed with the end wall 240 by a cast process.

As illustrated in FIGS. 2 and 9, the plurality of first ribs 242 may extend in the height direction of the end wall 240, and may be spaced apart from each other in the second direction Y.

The first ribs 242 may extend in the height direction of the end wall 240. The first ribs 242 are configured to improve strength of the end wall 240 and, in one or more embodiments, to be integrally formed with the end wall 240 in a cast process using an upper mold and a lower mold.

Further, in the illustrated embodiment, the first ribs 242 are spaced apart from each other in the second direction Y, thereby achieving uniformity and stably improving the strength for the entire end wall 240. FIG. 11 illustrates a cross-section of the plurality of first ribs 242 spaced apart from each other in the second direction Y.

FIG. 11 illustrates the end support 120 in which the plurality of second ribs 122 is formed on the end surface. Swelling force transferred from the plurality of unit cells 110 is applied to the end support 120 at the time of the generation of swelling, so that the end support 120 needs to respond to expansion of the unit cells 110 and be strong again transformation and damage according to the swelling phenomenon.

Accordingly, the second ribs 122 on the end surface of the end support 120 improve the strength of the end support 120. That is, an interior surface of the end support 120, that is, the surface opposite to the end surface, is in surface contact with the exterior surface of the outermost cell of the cell stack 100 or the insulation member 112 to uniformly secure pressing performance, and the second ribs 122 are formed on the end surface (e.g., the exterior surface facing away from the outermost cell of the cell stack 100) of the end support 120.

Further, as illustrated in FIG. 11, in an exemplary embodiment of the present disclosure, the second ribs 122 may be spaced apart from each other in the second direction Y and the height direction of the end support 120 so as to form a lattice shape.

In an exemplary embodiment of the present disclosure, the second ribs 122 may be formed to approximately cross the entirety of the end surface in an extension direction, and some of the plurality of second ribs 122 are extended in the second direction Y and the remaining second ribs 122 are extended in the height direction of the end support 120, so that the plurality of second ribs 122 may be disposed to form a lattice form.

That is, in the end support 120, approximately quadrangular recesses may be disposed in the lattice shape on the end surface. The second ribs 122 may be separately manufactured and be coupled to the end surface of the end support 120 or be integrally formed with the end support 120 when the end support 120 is manufactured.

In an exemplary embodiment of the present disclosure, the fixed wall 250 of any one receiving part 220 may be defined to include the separation wall 230, one pair of end walls 240, and a part of the outer wall 210, and the separation wall 230 and the end walls 240 may be integrally formed through a cast process or the like.

Further, as illustrated in FIG. 2, in an exemplary embodiment of the present disclosure, one surface among the four surfaces of the fixed wall 250 corresponds to the separation wall 230, two other surfaces correspond to the end walls 240, and one remaining surface may be formed of the outer wall 210 of the module housing 200.

In the battery module 1000 according to an exemplary embodiment of the present disclosure, the end walls 240, the separation wall 230, and the outer wall 210 of the module housing 200 may be integrally formed with a floor surface 260 by a cast process.

That is, in an exemplary embodiment of the present disclosure, the end walls 240 and the separation walls 230 may be integrally formed with the module housing 200, and when a mold is manufactured for the cast process, intaglio (e.g., recesses) of the end walls 240 and the separation wall 230 may be integrally formed in the mold.

Further, in an exemplary embodiment of the present disclosure, the end walls 240 and the separation wall 230 may also be integrally formed with the outer wall 210 of the module housing 200. In this case, in the module housing 200, all of the outer wall 210, the separation wall 230, the end walls 240, and the floor surface 260 may be integrally formed.

Figure 14:
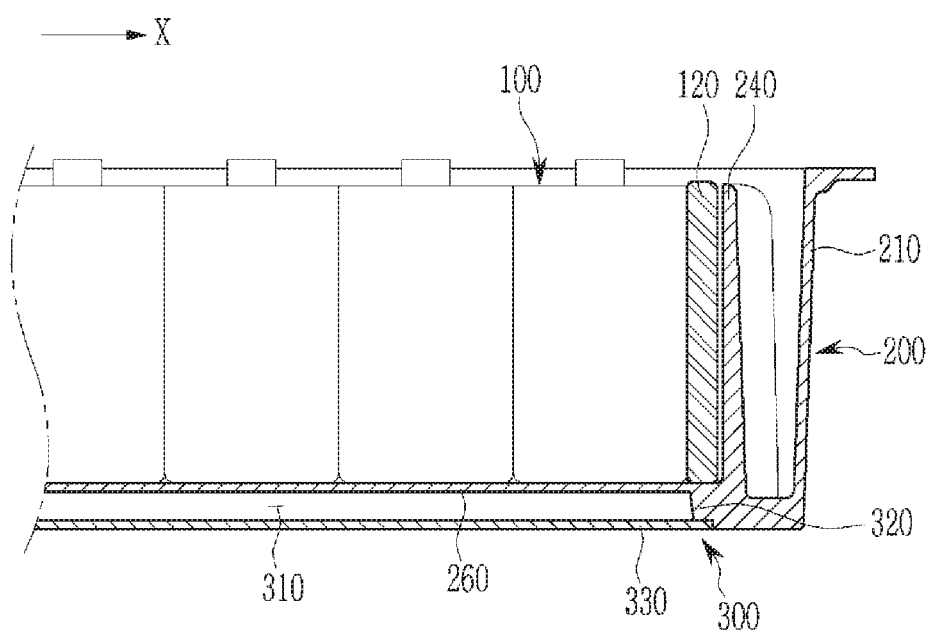
FIG. 14 is a diagram schematically illustrating a cooling channel in the battery module according to the exemplary embodiment of the present invention.
Figure 15:
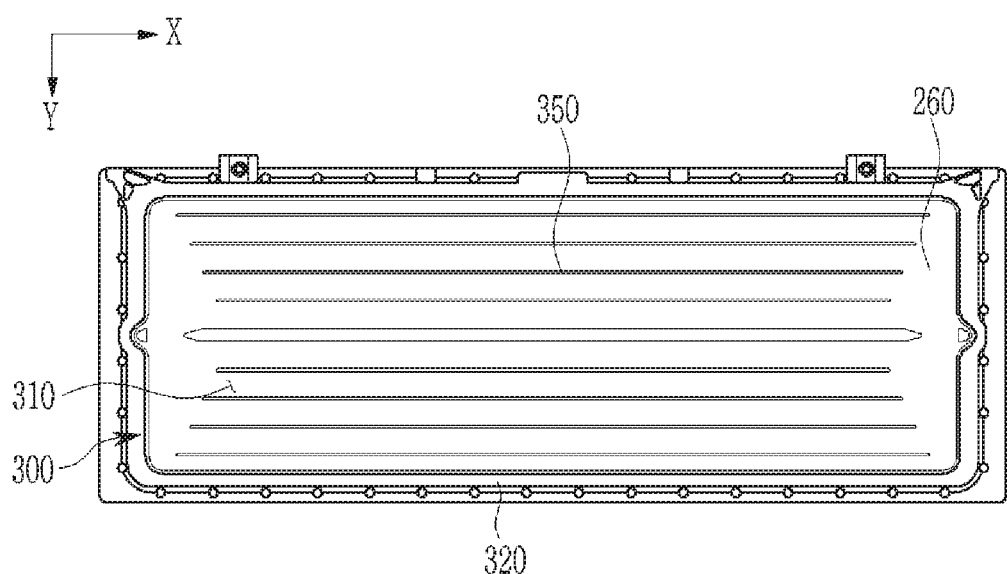
FIG. 15 is a diagram of the cooling channel in the battery module according to the exemplary embodiment of the present invention viewed from a bottom side.

FIG. 14 illustrates a cross-section of the module housing 200 according to an exemplary embodiment of the present disclosure, and illustrates the state where a cooling channel 300 having a flow space 310, in which coolant flows, is formed under the floor surface 260 of the module housing 200. FIG. 15 illustrates the cooling channel 300 viewed from the bottom.

As illustrated in FIG. 12, in the battery module 1000 according to an exemplary embodiment of the present disclosure, the module housing 200 may be formed with the cooling channel 300, through which coolant flows, under the floor surface 260. Further, a plurality of guide ribs 350, which extend in a flowing direction of the coolant and guides a flow of the coolant, may be provided on a lower surface of the floor surface 260 as illustrated in FIG. 15.

The flow space 310 of the cooling channel 300 may be formed throughout the entirety of the floor surface 260 or may also be formed to correspond to a cross-sectional area of the internal space of the module housing 200 in which the receiving parts 220 are formed. For example, the flow space 310 of the cooling channel 300 may be designed not to be present in the lower portion of the first impact absorption space 215. Coolant flows inside the cooling channel 300, and various refrigerants, such as air, replacing the coolant may also be used.

The unit cell 110 configuring the cell stack 100 corresponds to a heating body emitting heat at the time of the discharge, and when a temperature of the unit cell 110 increases excessively, the swelling phenomenon is induced or heat is rapidly increased through a rapid chemical reaction, so that a thermal runaway phenomenon generating fire and the like may occur.

Further, in the case where the cell stack 100, in which the plurality of unit cells 110 is arranged, is used like n exemplary embodiment of the present excessively, when the thermal runaway phenomenon is generated in any one unit cell 110, a thermal runaway dispersion phenomenon influencing another peripheral unit cell 110 may occur.

When the plurality of unit cells 110 is disposed as described above, it may be important to cool or dissipate heat generated in the cell stack 100, and thus the battery module 1000 according to an exemplary embodiment of the present disclosure includes the cooling channel 300 under the floor surface 260 of the module housing 200 to efficiently implement the cooling of the whole of the plurality of cell stacks 100.

Further, in an exemplary embodiment of the present disclosure, the cooling channel 300 is formed under the floor space 260 of the module housing 200, that is, in the space separated from the internal space of the module housing 200, not the inside of the module housing 200, so that it is possible to more easily repair and manage the cooling channel 300.

In the battery module 1000 according to an exemplary embodiment of the present disclosure, the lateral wall 320 of the cooling channel 300 protrudes from the floor surface 260 in the down direction, extends along a border of the floor surface 260 and surrounds the floor surface 260, and the channel cover 330 is coupled to a lower end of the lateral wall 320 to seal the cooling channel 300.

Further, the lateral wall 320 of the cooling channel 300 may be integrally formed with the floor surface 260 of the module housing 200 through the cast process, and the channel cover 330 may be welded and coupled to the lateral wall 320 of the cooling channel 300.

FIG. 14 illustrates the state where the lateral wall 320 of the cooling channel 300 extends along the border of the floor surface 260 of the module housing 200, surrounds the floor surface 260, and protrudes from the floor surface 260 in the down direction.

In an exemplary embodiment of the present disclosure, the lateral wall 320 of the cooling channel 300 is integrally formed with the floor surface 260 of the module housing 200 through the cast process, so that a coupling region between the lateral wall 320 and the floor surface 260 does not exist, and thus, it is possible to prevent the coolant from unintentionally leaking into the module housing 200.

The channel cover 330 sealing the cooling channel 300 may be coupled to the lateral wall 320 of the cooling channel 300 by a method, such as welding, and a border of the channel cover 330 may be coupled to the lower end of the lateral wall 320.

The coupling method may be various, but a gasket may be provided or welded for preventing leakage of the coolant, and FIG. 15 illustrates the cooling channel 300 viewed from the bottom side in the state where the channel cover 330 is removed.

In one or more embodiments, all of the outer wall 210 and the floor surface 260 of the module housing 200 and the lateral wall 320 of the cooling channel 300 are integrally formed through the cast process, so that a water leakage possible region does not exist, and further, the cooling channel 300 is provided in the lower portion of the floor surface 260 of the module housing 200, that is, the outside of the internal space of the module housing 200, so that even if the coolant unintentionally leaks from the cooling channel 300, it is possible to prevent the coolant from flowing into the internal space of the module housing 200 in which the cell stacks 100 are present.

As a result, in an exemplary embodiment of the present disclosure, the plurality of cell stacks 100 is inserted to simplify an assembling process and components and effectively satisfy high power demanded, it is possible to effectively cool the plurality of cell stacks 100 through the cooling channel 300, and further, it is possible to effectively protect the plurality of cell stacks 100 from a coolant leakage phenomenon that may occur in the cooling channel 300.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 100: Cell stack | 110: Unit cell |
| 112: Insulation member | 120: End support |
| 122: Second rib | 150: Terminal unit |
| 151: First terminal | 152: Second terminal |
| 172: Stack bus bar | 174: Connection bus bar |
| 176: Terminal bus bar | 178: Cross bus bar |
| 200: Module housing | 210: Outer wall |
| 211: First wall | 212: Second wall |
| 215: First impact absorption space | |
| 216: Second impact absorption space | |
| 220: Receiving part | 230: Separation wall |
| 240: End wall | 242: First rib |
| 250: Fixed wall | 260: Floor surface of module housing |
| 300: Cooling channel | 310: Flow space |
| 320: Lateral wall of cooling channel | 330: Channel cover |
| 350: Guide rib | 400: Coupling part |
| 500: Connector | 510: Male connector |
| 512: First protrusion | 514: Second protrusion |
| 515: Electrical connection part | 517: Signal connection part |
| 519, 539: Communicating hole | 520: Seal supporting wall |
| 530: Female connector | 532: First accommodating part |
| 534: Second accommodating part | 535: Electrical connection part |
| 537: Signal connection part | 550: Guide protrusion |
| 555: Fastening recess | 570: Guide recess |
| 575: Fastening hole | 580: Fastening member |
| 1000: Battery module | |

What is claimed is:

1. A battery module, comprising:
   a first module and a second module, each of the first and second modules comprising:
     a plurality of cell stacks, each cell stack of the plurality of cell stacks comprising a plurality of unit cells arranged in a first direction and an insulation member insulating at least one unit cell of the plurality of unit cells;
     a module housing;
     a coupling part on the module housing, the coupling part configured to couple the module housing of the first module to the module housing of the second module; and
   a plurality of receiving parts in the module housing, the plurality of receiving parts accommodating the plurality of cell stacks;

wherein each receiving part of the plurality of receiving parts includes a fixed wall around a respective cell stack and having at least a portion in contact with the respective cell stack, and wherein the coupling part comprises a connector configured to electrically connect the module housing of the first module to the module housing of the second module, wherein the connector comprises:
- a male connector on a first wall of a first outer wall around an internal space of the module housing of the first module; and
- a female connector on a second wall of a second outer wall around an internal space of the module housing of the second module, wherein the female connector is configured to be coupled to the male connector, wherein, when the female connector is coupled to the male connector, the first wall and the second wall are arranged in a second direction perpendicular to the first direction, wherein the coupling part further comprises:
- a guide protrusion of the male connector on the first wall and protruding in the second direction; and
- a guide recess of the female connector on the second wall and into which the guide protrusion is configured to be inserted, and wherein:
- the guide protrusion comprises a fastening recess in a height direction of the first outer wall,
- the guide recess comprises a fastening hole at a position corresponding to the fastening recess, and
- the guide protrusion is configured to be coupled to the guide recess with a fastening member extending through the fastening hole and into the fastening recess.

2. The battery module of claim 1, wherein:
the male connector comprises a first electrical connection part, which protrudes in the second direction and is electrically connected with the plurality of cell stacks inside the module housing of the first module, and
the female connector includes a second electrical connection part, which is indented in the second direction and into which the first electrical connection part of the male connector is configured to be inserted.

3. The battery module of claim 2, wherein:
the male connector further comprises a first signal connection part, which protrudes in the second direction and is configured to transfer a management control signal of the plurality of cell stacks of the first module, and
the female connector further includes a second signal connection part, which is indented in the second direction and into which the first signal connection part of the male connector is configured to be inserted.

4. The battery module of claim 1, wherein:
a center of the connector includes a communicating hole through which an internal side and an external side of the module housing communicate.

5. The battery module of claim 3, wherein the male connector further comprises a seal supporting wall surrounding the first electrical connection part and the first signal connection part and protruding in the second direction, and a sealing member at an end portion of the seal supporting wall.

6. The battery module of claim 2, wherein:
the plurality of receiving parts form a first column and a second column spaced apart from the first column in the first direction, and
a first set of cell stacks of the plurality of cell stacks in the first column are electrically separated within the module housing from a second set of cell stacks of the plurality of cell stacks in the second column.

7. The battery module of claim 6, further comprising:
a plurality of stack bus bars, each stack bus bar of the plurality of stack bus bars electrically connecting a plurality of unit cells in each of the plurality of cell stacks;
a connection bus bar electrically connecting two cell stacks of the plurality of cell stacks adjacent in the second direction in the first column or the second column; and
a plurality of terminal bus bars, each terminal bus bar connected to a respective cell stack of the plurality of cell stacks and the first electrical connection part or the second electrical connection part.

8. The battery module of claim 7, wherein:
the first electrical connection part includes a first protrusion electrically connected with the first set of cell stacks in the first column of the first module, and a second protrusion electrically connected with the second set of cell stacks in the second column of the first module, and
the second electrical connection part includes a first accommodating part electrically connected with the first set of cell stacks in the first column of the second module and configured to be coupled with the first protrusion of the first module, and a second accommodating part electrically connected with the second set of cell stacks in the second column of the second module and configured to be coupled with the second protrusion of the first module.

9. The battery module of claim 8, wherein:
each terminal bus bar of the plurality of terminal bus bars is connected to a unit cell at one end portion in the respective cell stack and the connection bus bar is connected to a unit cell at the other end portion of the respective cell stack, and
the one end portion of the respective cell stack faces a space between the first column and the second column, and the terminal bus bar extends to the space between the first column and the second column.

10. The battery module of claim 9, wherein:
first terminal bus bars of the plurality of terminal bus bars connected to the first set of cell stacks of the first column and second terminal bus bars of the plurality of terminal bus bars connected to the second set of cell stacks of the second column alternate in the second direction.

11. The battery module of claim 1, wherein:
the fixed wall of each receiving part comprises:
a separation wall crossing an internal space surrounded by an outer wall of the module housing in the first direction and in contact with a side surface of the respective cell stack; and
end walls at opposite ends in the first direction and engaging respective end surfaces of the respective cell stack in the first direction.

12. The battery module of claim 11, wherein:
a first end wall of the end walls faces the outer wall of the module housing and is spaced apart from the outer wall in the first direction such that a first impact absorption space is formed between the first end wall and the outer wall.

13. The battery module of claim 12, wherein:
in two receiving parts adjacent in the first direction, second end walls of the end walls facing each other in the first direction are spaced apart from each other such that a second impact absorption space is formed between the second end walls, and
a plurality of terminal bus bars extend from the plurality of cell stacks to the second impact absorption space.

14. The battery module of claim 13, wherein:
each cell stack of the plurality of cell stacks further includes one pair of end supports at opposite end portions in the first direction, the pair of end supports having exterior surfaces corresponding to the respective end surfaces of the respective cell stack, and
each end wall of the end walls is bent outwardly such that a center portion of each end wall is spaced from the respective end surface, and each end surface of the end surface is indented inwardly such that a center portion is spaced from the respective end wall.

15. The battery module of claim 14, wherein:
each end wall includes a plurality of first ribs extending in a third direction perpendicular to the first and second directions on an exterior surface of the end wall and being spaced apart from each other in the second direction, and
each end support of the pair of end supports includes a plurality of second ribs spaced apart from each other in the second direction and the third direction of the end support.

16. The battery module of claim 1, wherein:
the module housing includes a cooling channel under a floor surface of the module housing, the cooling channel configured to accommodate a flow of coolant.

17. The battery module of claim 1, wherein:
the male connector further comprises a first electrical connection part electrically connected with the plurality of cell stacks inside the module housing of the first module, a first signal connection part configured to transfer a management control signal of the plurality of cell stacks of the first module, a first communicating hole through which an internal side and an external side of the module housing communicate, and a seal supporting wall surrounding the first electrical connection part, the first signal connection part, and the first communicating hole, and a sealing member at an end portion of the seal supporting wall; and
the female connector further comprises a second electrical connection part electrically connected with the plurality of cell stacks inside the module housing of the second module and into which the first electrical connection part of the male connector is configured to be inserted, a second signal connection part into which the first signal connection part of the male connector is configured to be inserted, and a second communicating hole through which an internal side and an external side of the module housing communicate, and
when the male connector is coupled to the female connector, the seal supporting wall and the sealing member extend around the second electrical connection part, the second signal connection part, and the second communicating hole of the female connector.

\* \* \* \* \*